United States Patent
Ryu et al.

(10) Patent No.: US 7,159,624 B2
(45) Date of Patent: Jan. 9, 2007

(54) LIQUID CRYSTAL DISPENSING SYSTEM USING SPACER INFORMATION AND METHOD OF DISPENSING LIQUID CRYSTAL MATERIAL USING THE SAME

(75) Inventors: Joung-Ho Ryu, Seoul (KR); Soo-Min Kwak, Gyeongsangbuk-Do (KR); Hae-Joon Son, Busan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 64 days.

(21) Appl. No.: 10/874,534

(22) Filed: Jun. 24, 2004

(65) Prior Publication Data

US 2004/0261895 A1    Dec. 30, 2004

(30) Foreign Application Priority Data

Jun. 24, 2003    (KR) ..................... 10-2003-0041275

(51) Int. Cl.
   *B65B 1/04* (2006.01)
(52) U.S. Cl. ..................... 141/95; 141/67; 141/198
(58) Field of Classification Search ........ 222/386–388; 427/256; 118/665, 688; 141/95, 198, 192, 141/4, 7, 286, 301
   See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,575,317 A | 3/1986 | Lindner |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,526,745 A | 6/1996 | Uera |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |

(Continued)

FOREIGN PATENT DOCUMENTS

EP    1 003 066    5/2000

(Continued)

*Primary Examiner*—Steven O. Douglas
(74) *Attorney, Agent, or Firm*—McKenna Long & Aldridge LLP

(57) ABSTRACT

A liquid crystal dispensing system includes a container, a discharge pump, a nozzle, and a control unit. The discharge pump draws in and discharges liquid crystal that is contained in the container. The nozzle dispenses the liquid crystal discharged from the discharge pump onto a substrate. The control unit determines a dispensing amount of liquid crystal based on a spacer height formed at the substrate and to control the discharge pump in order to dispense the determined amount of liquid crystal onto the substrate.

35 Claims, 13 Drawing Sheets

U.S. PATENT DOCUMENTS

| | | | |
|---|---|---|---|
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,610,364 B1 * | 8/2003 | Kweon et al. | 427/256 |
| 6,819,392 B1 | 11/2004 | Murata et al. | |
| 2001/0021000 A1 | 9/2001 | Egami | |
| 2001/0026348 A1 | 10/2001 | Murata et al. | |
| 2003/0068244 A1 | 4/2003 | Shibuya | |
| 2004/0011422 A1 | 1/2004 | Ryu et al. | |

FOREIGN PATENT DOCUMENTS

| | | |
|---|---|---|
| EP | 1 003 066 A1 | 5/2000 |
| JP | 51-65656 | 6/1976 |
| JP | 57-038414 | 3/1982 |
| JP | 57-38414 | 3/1982 |
| JP | 57-088428 | 6/1982 |
| JP | 57-88428 | 6/1982 |
| JP | 58-027126 | 2/1983 |
| JP | 58-27126 | 2/1983 |
| JP | 59-057221 | 4/1984 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-007822 | 1/1986 |
| JP | 61-055625 | 3/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-089025 | 4/1987 |
| JP | 62-90622 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-127179 | 5/1993 |
| JP | 05-154923 | 6/1993 |
| JP | 5-154923 | 6/1993 |
| JP | 05-265011 | 10/1993 |
| JP | 5-265011 | 10/1993 |
| JP | 5-281557 | 10/1993 |
| JP | 05-281557 | 10/1993 |
| JP | 5-281562 | 10/1993 |
| JP | 05-281562 | 10/1993 |
| JP | H06-018829 | 1/1994 |
| JP | 06-051256 | 2/1994 |
| JP | 6-51256 | 2/1994 |
| JP | 6-51256 A | 2/1994 |
| JP | H06-064229 | 3/1994 |
| JP | 06-148657 | 5/1994 |
| JP | 6-148657 | 5/1994 |
| JP | 6-160871 | 6/1994 |
| JP | 06-160871 | 6/1994 |
| JP | H06-194637 | 7/1994 |
| JP | 6-235925 | 8/1994 |
| JP | 06-235925 | 8/1994 |
| JP | 6-265915 | 9/1994 |
| JP | 06-265915 | 9/1994 |
| JP | 06-313870 | 11/1994 |
| JP | 6-813870 | 11/1994 |
| JP | 7-84268 | 3/1995 |
| JP | 07-084268 | 3/1995 |
| JP | 7-128674 | 5/1995 |
| JP | 07-128674 | 5/1995 |
| JP | 7-181507 | 7/1995 |
| JP | 07-181507 | 7/1995 |
| JP | H07-275770 | 10/1995 |
| JP | H07-275771 | 10/1995 |
| JP | 7-323520 | 12/1995 |
| JP | H08-076133 | 3/1996 |
| JP | 08-095066 | 4/1996 |
| JP | 8-95066 | 4/1996 |
| JP | 08-101395 | 4/1996 |
| JP | 8-101395 | 4/1996 |
| JP | 8-106101 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 8-171094 | 7/1996 |
| JP | 8-190099 | 7/1996 |
| JP | 08-190099 | 7/1996 |
| JP | H08-173874 | 7/1996 |
| JP | 08-240807 | 9/1996 |
| JP | 8-240807 | 9/1996 |
| JP | 9-5762 | 1/1997 |
| JP | 09-005762 | 1/1997 |
| JP | 09-026578 | 1/1997 |
| JP | 9-26578 | 1/1997 |
| JP | H09-001026 | 1/1997 |
| JP | 09-311340 | 2/1997 |
| JP | 9-61829 | 3/1997 |
| JP | 09-61829 | 3/1997 |
| JP | 09-073075 | 3/1997 |
| JP | 9-73075 | 3/1997 |
| JP | 09-073096 | 3/1997 |
| JP | 9-73096 | 3/1997 |
| JP | H09-094500 | 4/1997 |
| JP | 09-127528 | 5/1997 |
| JP | 9-127528 | 5/1997 |
| JP | 09-230357 | 9/1997 |
| JP | 9-230357 | 9/1997 |
| JP | 09-281511 | 10/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-14953 | 1/1999 |
| JP | 11-038424 | 2/1999 |
| JP | 11-38424 | 2/1999 |
| JP | 11-64811 | 3/1999 |
| JP | 11-064811 | 3/1999 |

| | | | | | |
|---|---|---|---|---|---|
| JP | 11-109388 | 4/1999 | JP | 2001-255542 | 9/2001 |
| JP | 11-133438 | 5/1999 | JP | 2001-264782 | 9/2001 |
| JP | 11-142864 | 5/1999 | JP | 2001-272640 | 10/2001 |
| JP | 11-174477 | 7/1999 | JP | 2001-281675 | 10/2001 |
| JP | 11-212045 | 8/1999 | JP | 2001-281678 | 10/2001 |
| JP | 11-248930 | 9/1999 | JP | 2001-282126 | 10/2001 |
| JP | H11-262712 | 9/1999 | JP | 2001-305563 | 10/2001 |
| JP | H11-264991 | 9/1999 | JP | 2001-330837 | 11/2001 |
| JP | 11-326922 | 11/1999 | JP | 2001-330840 | 11/2001 |
| JP | 11-344714 | 12/1999 | JP | 2001-356353 | 12/2001 |
| JP | 2000-2879 | 1/2000 | JP | 2001-356354 | 12/2001 |
| JP | 2000-002879 | 1/2000 | JP | 2002-14360 | 1/2002 |
| JP | 2000-029035 | 1/2000 | JP | 2002-014360 | 1/2002 |
| JP | 2000-29035 | 1/2000 | JP | 2002-23176 | 1/2002 |
| JP | 2000-056311 | 2/2000 | JP | 2002-023176 | 1/2002 |
| JP | 2000-56311 | 2/2000 | JP | 2002-049045 | 2/2002 |
| JP | 2000-66165 | 3/2000 | JP | 2002-49045 | 2/2002 |
| JP | 2000-066165 | 3/2000 | JP | 2002-079160 | 3/2002 |
| JP | 2000-066218 | 3/2000 | JP | 2002-080321 | 3/2002 |
| JP | 2000-093866 | 4/2000 | JP | 2002-082340 | 3/2002 |
| JP | 2000-137235 | 5/2000 | JP | 2002-82340 | 3/2002 |
| JP | 2000-147528 | 5/2000 | JP | 2002-090759 | 3/2002 |
| JP | 2000-193988 | 7/2000 | JP | 2002-90759 | 3/2002 |
| JP | 2000-241824 | 9/2000 | JP | 2002-090760 | 3/2002 |
| JP | 2000-284295 | 10/2000 | JP | 2002-90760 | 3/2002 |
| JP | 2000-292799 | 10/2000 | JP | 2002-107740 | 4/2002 |
| JP | 2000-310759 | 11/2000 | JP | 2002-122870 | 4/2002 |
| JP | 2000-310784 | 11/2000 | JP | 2002-122872 | 4/2002 |
| JP | 2000-338501 | 12/2000 | JP | 2002-122873 | 4/2002 |
| JP | 2001-5401 | 1/2001 | JP | 2002-131762 | 5/2002 |
| JP | 2001-005401 | 1/2001 | JP | 2002-139734 | 5/2002 |
| JP | 2001-005405 | 1/2001 | JP | 2002-156518 | 5/2002 |
| JP | 2001-5405 | 1/2001 | JP | 2002-169166 | 6/2002 |
| JP | 2001-013506 | 1/2001 | JP | 2002-169167 | 6/2002 |
| JP | 2001-13506 | 1/2001 | JP | 2002-182222 | 6/2002 |
| JP | 2001-033793 | 2/2001 | JP | 2002-202512 | 7/2002 |
| JP | 2001-33793 | 2/2001 | JP | 2002-202514 | 7/2002 |
| JP | 2001-042341 | 2/2001 | JP | 2002-214626 | 7/2002 |
| JP | 2001-42341 | 2/2001 | JP | 2002-229042 | 8/2002 |
| JP | 2001-051284 | 2/2001 | JP | 2002-236276 | 8/2002 |
| JP | 2001-51284 | 2/2001 | JP | 2002-236292 | 9/2002 |
| JP | 2001-66615 | 3/2001 | JP | 2002-258299 | 9/2002 |
| JP | 2001-066615 | 3/2001 | JP | 2002-277865 | 9/2002 |
| JP | 2001-91727 | 4/2001 | JP | 2002-277866 | 9/2002 |
| JP | 2001-091727 | 4/2001 | JP | 2002-277881 | 9/2002 |
| JP | 2001-115951 | 4/2001 | JP | 2002-287156 | 10/2002 |
| JP | 2001-117105 | 4/2001 | JP | 2002-296605 | 10/2002 |
| JP | 2001-117109 | 4/2001 | JP | 2002-311438 | 10/2002 |
| JP | 2001-133745 | 5/2001 | JP | 2002-311440 | 10/2002 |
| JP | 2001-133794 | 5/2001 | JP | 2002-311442 | 10/2002 |
| JP | 2001-133799 | 5/2001 | JP | 2002-323687 | 11/2002 |
| JP | 2001-142074 | 5/2001 | JP | 2002-323694 | 11/2002 |
| JP | 2001-147437 | 5/2001 | JP | 2002-333628 | 11/2002 |
| JP | 2001-15421 | 6/2001 | JP | 2002-333635 | 11/2002 |
| JP | 2001-154211 | 6/2001 | JP | 2002-333843 | 11/2002 |
| JP | 2001-166272 | 6/2001 | JP | 2002-341329 | 11/2002 |
| JP | 2001-166310 | 6/2001 | JP | 2002-341355 | 11/2002 |
| JP | 2001-183683 | 7/2001 | JP | 2002-341356 | 11/2002 |
| JP | 2001-201750 | 7/2001 | JP | 2002-341357 | 11/2002 |
| JP | 2001-209052 | 8/2001 | JP | 2002-341358 | 11/2002 |
| JP | 2001-209056 | 8/2001 | JP | 2002-341359 | 11/2002 |
| JP | 2001-209057 | 8/2001 | JP | 2002-341362 | 11/2002 |
| JP | 2001-209058 | 8/2001 | JP | 2003-112408 | 4/2003 |
| JP | 2001-209060 | 8/2001 | KR | 2000-0035302 | 6/2000 |
| JP | 2001-215459 | 8/2001 | WO | WO 86/06794 | 11/1986 |
| JP | 2001-222017 | 8/2001 | | | |
| JP | 2001-235758 | 8/2001 | | * cited by examiner | |

LIQUID CRYSTAL DISPENSING SYSTEM USING SPACER INFORMATION AND METHOD OF DISPENSING LIQUID CRYSTAL MATERIAL USING THE SAME

The present application claims the benefit of Korean Patent Application No. 2003-41275 filed in Korea on Jun. 24, 2003. The present application further incorporates by reference U.S. patent application Ser. No. 10/421,714, which has published as US Patent Publication No. 2004-0011422-A1.

BACKGROUND OF THE INVENTION

1. Field of the Invention

The present invention relates to a liquid crystal dispensing system, and more particularly, to a liquid crystal dispensing system for dispensing a precise amount of liquid crystal onto liquid crystal panels having different sizes formed on a multi-model glass substrate.

2. Description of the Related Art

Recently, various portable electric devices, such as mobile phones, personal digital assistants (PDAs), and notebook computers, have been developed because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of an LCD device according to the related art. In FIG. 1, an LCD device 1 comprises a lower substrate 5, an upper substrate 3, and a liquid crystal layer 7 formed therebetween. The lower substrate 5 is a driving device array substrate, and includes a plurality of pixels (not shown) and a driving device, such as a thin film transistor (TFT), formed on each pixel. The upper substrate 3 is a color filter substrate, and includes a color filter layer for reproducing real color. In addition, a pixel electrode and a common electrode are formed on the lower substrate 5 and the upper substrate 3, respectively. An alignment layer is formed on both the lower and upper substrates 5 and 3 to align liquid crystal molecules of the liquid crystal layer 7. The lower substrate 5 and the upper substrate 3 are attached along a perimeter by a sealant 9, and the liquid crystal 7 is confined within the perimeter. In operation, the liquid crystal molecules of the liquid crystal layer 7 are reoriented by the driving device formed on the lower substrate 5 to control amounts of light transmitted through the liquid crystal layer 7, thereby displaying an image.

FIG. 2 is a flow chart of a fabrication method for an LCD device according to the related art. In FIG. 2, a fabrication method includes three sub-processes for manufacturing an LCD device: a driving device array substrate process for forming the driving device on the lower substrate 5; a color filter substrate process for forming the color filter on the upper substrate 3; and a cell process.

In Step S101, a plurality of gate lines and data lines are formed on the lower substrate 5 to define a pixel area by the driving device array process, and the thin film transistor connected to both the gate line and the data line is formed on the each pixel area. In addition, a pixel electrode, which is to be connected to the thin film transistor to drive the liquid crystal layer according to a signal applied through the thin film transistor, is formed by the driving device array process. In Step S104, R, G, and B color filter layers for reproducing the color and a common electrode are formed on the upper substrate 3 by the color filter process.

In Steps S102 and S105, alignment layers are formed on the lower substrate 5 and the upper substrate 3. Then, the alignment layers are individually rubbed to induce surface anchoring (i.e. a pretilt angle and an alignment direction) for the liquid crystal molecules of the liquid crystal layer 7. In Step S103, a spacer is dispersed onto the lower substrate 5 for maintaining a uniform cell gap between the lower and upper substrates 5 and 3. In Step S106, a sealant is printed along outer portions of the upper substrate 3.

In Step S107, the lower and upper substrates 5 and 3 are assembled together by compression. The lower substrate 5 and the upper substrate 3 are both made of glass substrates, and include a plurality of unit panel areas on which the driving device and the color filter layer are formed. In Step S108, the assembled upper and lower glass substrates 5 and 3 are cut into unit panels. In Step S109, liquid crystal material is injected into the gap formed between the upper and lower substrates 5 and 3 of the unit panels through a liquid crystal injection hole. The filled unit panel is completed by sealing the liquid crystal injection hole. In Step S110, the filled and sealed unit panel is tested.

FIG. 3 is a schematic view of a liquid crystal injection system for fabricating an LCD device according to the related art. In FIG. 3, a container 12 in which liquid crystal material 14 is contained is placed in a vacuum chamber 10, and the liquid crystal display panel 1 is located at an upper side of the container 12. Then, the vacuum chamber 10 is connected to a vacuum pump (not shown) to maintain a predetermined vacuum/pressure state within the vacuum chamber 10. In addition, a liquid crystal display panel moving device (not shown) is installed in the vacuum chamber 10 to move the liquid crystal display panel 1 from the upper side of the container 12 to a surface of the liquid crystal material 14, thereby contacting an injection hole 16 of the liquid crystal display panel 1 to the liquid crystal material 14. Accordingly, this method is commonly called as a liquid crystal dipping injection method.

When the vacuum/pressure level within the chamber 10 is decreased by an inflow of nitrogen gas ($N_2$) into the vacuum chamber 10 in the state that the injection hole 16 of the liquid crystal display panel 1 contacts the surface of the liquid crystal material 14, the liquid crystal material 14 is injected into the liquid crystal display panel 1 through the injection hole 16 by the pressure difference between the vacuum/pressure level within the liquid crystal display panel 1 and the pressure/level within the vacuum chamber 10. After the liquid crystal material 14 is completely filled into the liquid crystal display panel 1, the injection hole 16 is sealed by a sealant to seal the liquid crystal material 14 within the liquid crystal display panel 1. Accordingly, this method is called as a vacuum injection method.

However, there are several problems with both the liquid crystal dipping injection method and vacuum injection method. First, an overall time for injection of the liquid crystal material 14 into the panel 1 is relatively long for either method. In general, a gap between the driving device array substrate and the color filter substrate in the liquid crystal display panel 1 is relatively narrow, i.e., a few micrometers. Accordingly, a relatively small amount of liquid crystal material 14 is injected into the liquid crystal display panel 1 per unit time. For example, it takes about 8 hours to completely inject the liquid crystal material 14 into a 15-inch liquid crystal display panel, and thus, fabricating efficiency is decreased. Second, consumption of the liquid crystal material 14 during the liquid crystal injection method is large. Only a small amount of the liquid crystal material 14 in the container 12 is actually injected into the liquid crystal display panel 1. Accordingly, during loading of the liquid crystal display panel 1 into the vacuum chamber 10, the unused liquid crystal material 14 is exposed to atmosphere or to certain gases, thereby contaminating the liquid crystal material 14. Thus, any remaining liquid crystal material 14 must be discarded after the injection of the liquid crystal material 14 into a plurality of liquid crystal display panels 1, thereby increasing fabricating costs.

SUMMARY OF THE INVENTION

Accordingly, the present invention is directed to a liquid crystal dispensing system and method of dispensing liquid crystal material using the same that substantially obviates one or more of the problems due to limitations and disadvantages of the related art.

Therefore, an object of the present invention is to provide a liquid crystal dispensing system to directly dispense liquid crystal onto a glass substrate of a large area including at least one liquid crystal panel, and a method of dispensing liquid crystal material using the same.

Another object of the present invention is to provide a liquid crystal dispensing system that prevents inferior LCD devices by always dispensing a precise amount of liquid crystal by calculating a dispensing amount of liquid crystal based on a spacer height formed on a substrate, and a method of dispensing liquid crystal material using the same.

Still another object of the present invention is to provide a liquid crystal dispensing system capable of dispensing a precise amount of liquid crystal onto a substrate having a plurality of liquid crystal panels of different sizes, and a method of dispensing liquid crystal material using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing system comprises a container to contain liquid crystal; a discharge pump to draw in and discharge liquid crystal from the container; a nozzle to dispense the liquid crystal discharged from the discharge pump onto a substrate; and a control unit to determine a dispensing amount of liquid crystal based on a spacer height formed at the substrate and to control the discharge pump in order to dispense the determined amount of liquid crystal onto the substrate.

In another aspect, a liquid crystal dispensing system comprises a liquid crystal dispenser having a container to contain liquid crystal, a cylinder having a suction opening and a discharge opening, a discharge pump to draw in and discharging liquid crystal contained in the container through the suction opening and the discharge opening by being inserted into the cylinder and by moving up-down, and a nozzle to dispense liquid crystal discharged from the discharge pump onto a substrate; and a control unit to calculate a dispensing amount of liquid crystal to be dispensed onto the substrate based on a spacer height formed on the substrate and to control the discharge pump.

In another aspect, a liquid crystal dispensing system comprises a liquid crystal dispenser having a container to contain liquid crystal, a discharge pump having a piston to draw in and discharge liquid crystal contained in the container by an up-down motion of the piston, and a nozzle to dispense the liquid crystal discharged from the discharge pump onto a multi-model substrate for fabricating a plurality of liquid crystal panels of different sizes; and a control unit to calculate a dispensing amount of liquid crystal to be dispensed onto the plurality of liquid crystals panels based on a spacer height formed at the liquid crystal panel of the substrate, and to control the discharge pump in order to sequentially dispense liquid crystal onto the plurality of liquid crystal panels.

In another aspect, a method of dispensing liquid crystal material comprises inputting a spacer height formed on a substrate; calculating a dispensing amount of liquid crystal to be dispensed onto the substrate based on the spacer height; aligning a liquid crystal dispenser at a dispensing position, the liquid crystal dispenser including a container containing liquid crystal, a discharge pump having a piston to draw in and discharge liquid crystal contained in the container by an up-down motion of the piston, and a nozzle to dispensing liquid crystal discharged from the discharge pump onto a multi-model substrate for fabricating a plurality of liquid crystal panels of different sizes; and dispensing the calculated amount of liquid crystal onto the substrate.

In another aspect, a method of dispensing liquid crystal material comprises preparing a substrate including a plurality of liquid crystal panels having different sizes; inputting a spacer height formed at the liquid crystal panel; calculating a dispensing amount of liquid crystal to be dispensed on the liquid crystal panel based on the spacer height; aligning a liquid crystal dispenser at a dispensing position of a corresponding liquid crystal panel, the liquid crystal dispenser including a container containing liquid crystal, a discharge pump having a piston that draws in and discharges liquid crystal contained in the container by an up-down motion of the piston, and a nozzle that dispenses liquid crystal discharged from the discharge pump onto a multi-model substrate on which including a plurality of liquid crystal panels of different sizes; dispensing the calculated amount of liquid crystal onto the substrate; and aligning the liquid crystal dispenser at a dispensing position of the next liquid crystal panel on which liquid crystal is to be dispensed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

To solve the problems of the related liquid crystal injection methods such as a liquid crystal dipping method or a liquid crystal vacuum injection method, a liquid crystal dispensing method has been recently introduced. The liquid crystal dispensing method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dispensing method, the liquid crystal is directly dropped onto the substrate in a short time period so that the liquid crystal layer in a LCD of larger area can be formed quickly. In addition, the liquid crystal consumption can be minimized due to the direct dropping of the liquid crystal as much as required amount, and therefore, the fabrication cost can be reduced.

Figure 4:
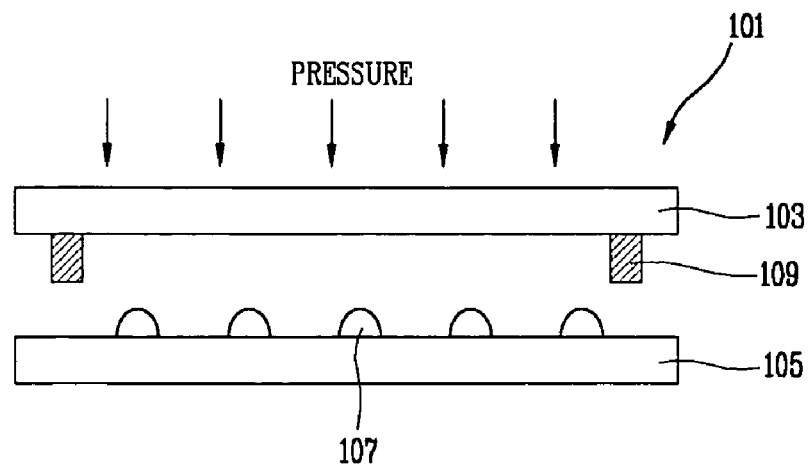
FIG. 4 is a cross sectional view of an LCD device fabricated by a liquid crystal dispensing method according to an embodiment of the present invention.

FIG. 4 is a view illustrating a basic concept of a liquid crystal dispensing method according to an embodiment of the present invention. In FIG. 4, liquid crystal material 107 may be dropped onto a lower substrate 105 having a driving device prior to assembling the lower substrate 105 and an upper substrate 103 having a color filter. Alternatively, the liquid crystal material 107 may be dropped onto the upper substrate 103 upon which the color filter is formed. For example, the liquid crystal material 107 may be formed either on a thin film transistor (TFT) substrate or on a color filter (CF) substrate.

A sealant 109 may be applied along at least an outer perimeter portion of the upper substrate 103. Then, the upper substrate 103 and the lower substrate 105 may be assembled together by pressing the upper and lower substrates 103 and 105 together to form an LCD display panel 101. Accordingly, the drops of the liquid crystal material 107 spread out between the upper and lower substrates 103 and 105 by pressure applied to the upper and/or lower substrates 103 and 105, thereby forming a liquid crystal material layer of uniform thickness between the upper substrate 103 and the lower substrate 105. Thus, in the exemplary LCD device fabrication method, the liquid crystal material 107 may be dropped onto the lower substrate 105 before the upper and lower substrates 103 and 105 are assembled together to form the LCD display panel 101.

Figure 5:
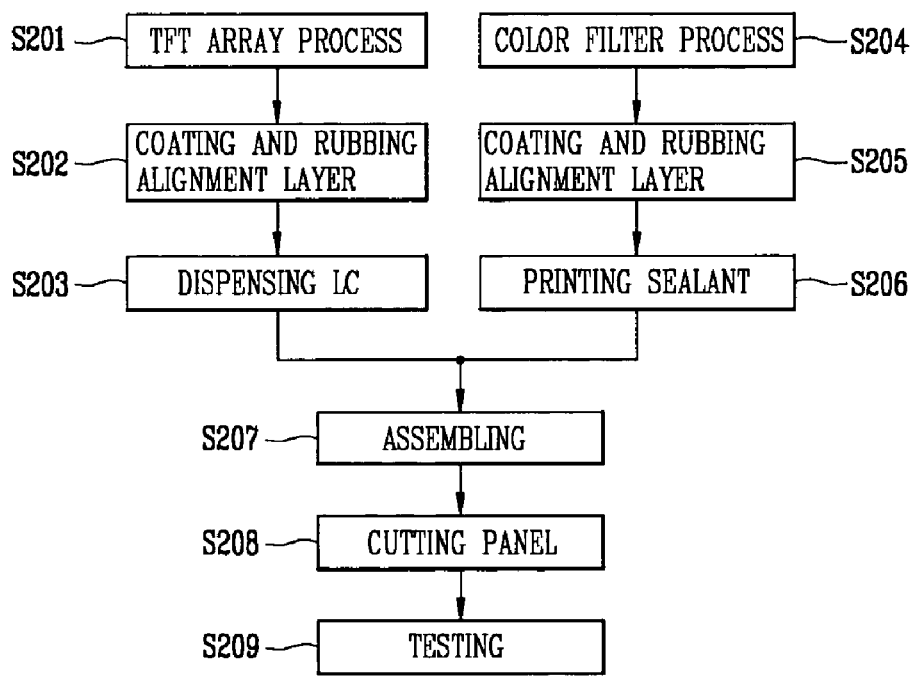
FIG. 5 is a flow chart of a fabrication method of an LCD device by a liquid crystal dispensing method according to an embodiment of the present invention.

FIG. 5 is a flow chart of an exemplary LCD device fabrication method according to an embodiment of the present invention. In Step S201, a driving device, such as a TFT, is formed on an upper substrate using a TFT array process. In Step S204, a color filter layer is formed on a lower substrate 105 using a color filter process. The TFT array process and the color filter process, which are generally similar to those of common processes, may be preferably applied to glass substrates having a plurality of unit panel areas. Herein, the upper and lower substrates may include a glass substrate having an area about 1000×1200 mm$^2$ or more. However, glass substrates having smaller areas also may be used.

In Steps S202 and S205, alignment layers may be formed and rubbed on both the upper and lower substrates. In Step S203, liquid crystal material 107 may be dropped onto a liquid crystal display unit panel area of the lower substrate 105. In Step S206, sealant 109 is applied along at least an outer perimeter portion area of the liquid crystal display unit panel area on the upper substrate.

In Step S207, the upper and lower substrates are disposed to face each other, and compressed to join the upper and lower substrates with each other using the sealant 109. Accordingly, the dropped liquid crystal material evenly spreads out between the upper and lower substrates and the sealant 109. In Step S208, the assembled upper and lower substrates are processed and cut into a plurality of liquid crystal display unit panels. In Step S209, the liquid crystal display unit panels are tested.

Figure 1:
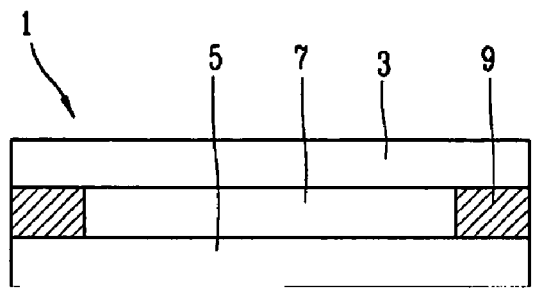
FIG. 1 is a cross sectional view of a liquid crystal display (LCD) device according to the related art.
Figure 2:
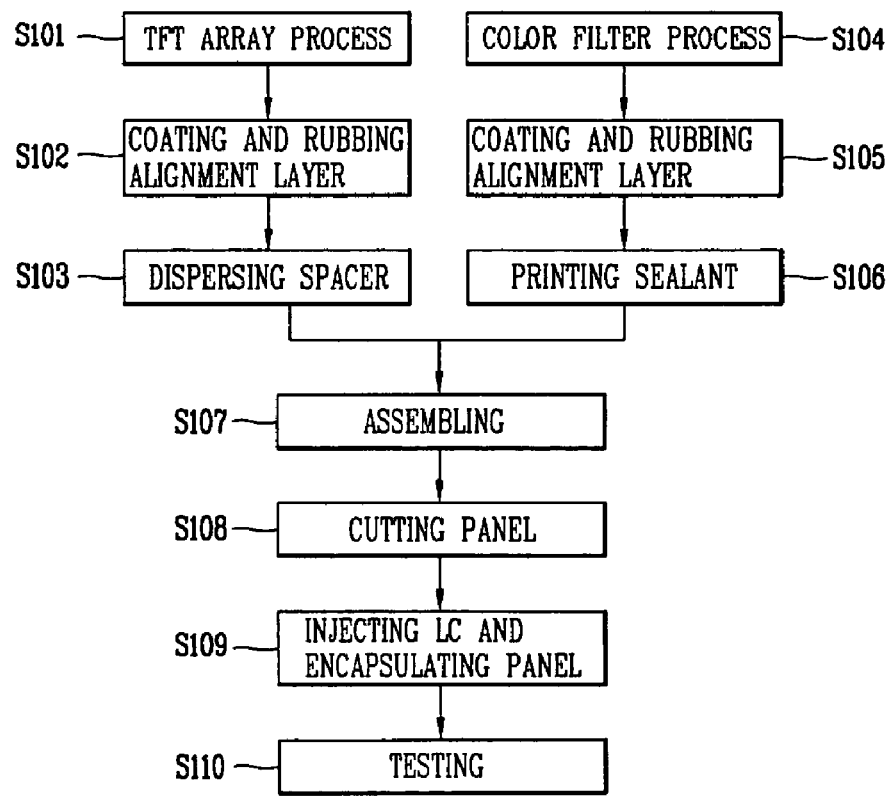
FIG. 2 is a flow chart of a fabrication method for an LCD device according to the related art.
Figure 3:
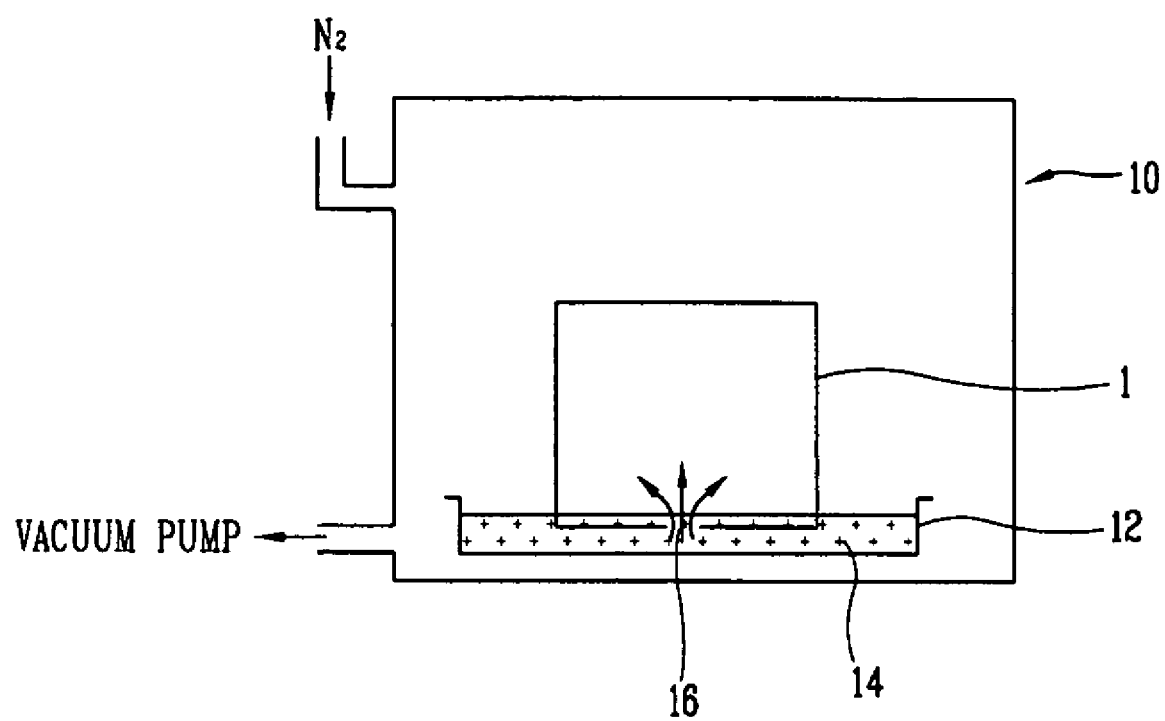
FIG. 3 is a schematic view of a liquid crystal injection system for fabricating an LCD device according to the related art.

The LCD device fabrication method using the liquid crystal dropping method of FIG. 5 is different from the LCD device fabrication method using the related art liquid crystal injection method in that a vacuum injection of liquid crystal is not used but rather a liquid crystal dropping, thereby reducing the processing time of a large area glass substrate. That is, in the LCD device fabrication method using the liquid crystal injection method of FIG. 2, liquid crystal is injected through an injection hole and then the injection hole is sealed by a sealant. However, in the LCD device fabrication method using the liquid crystal dropping method, liquid crystal is directly dropped onto the substrate and does not require the process sealing of the injection hole. Although not shown in FIG. 2, in the LCD device fabrication method using the liquid crystal injection method, the substrate is contacting the liquid crystal at the time of injecting liquid crystal so that an outer surface of the panel is contaminated by the liquid crystal. Therefore, a process for washing the contaminated substrate is required. However, in the LCD device fabrication method using the liquid crystal dropping method, liquid crystal is directly dropped onto the substrate so that the panel is not contaminated by the liquid crystal, and a washing process is not required. The LCD device fabrication method using the liquid crystal dropping method is more simple than the LCD device fabrication method using the liquid crystal injection method, thereby having an increased fabricating efficiency and an increased yield.

In the LCD device fabrication method using the liquid crystal dropping method, a dropping position of liquid crystal and a dropping amount of liquid crystal have the most influence on forming a liquid crystal layer with a desired thickness. Especially, since the thickness of a liquid crystal layer is closely related to a cell gap of a liquid crystal panel, a precise dropping position of liquid crystal and a precise amount of liquid crystal are very important to prevent inferiority of a liquid crystal panel. To drop a precise amount of liquid crystal onto a precise position, a liquid crystal dispenser is provided in the present invention.

Figure 6:
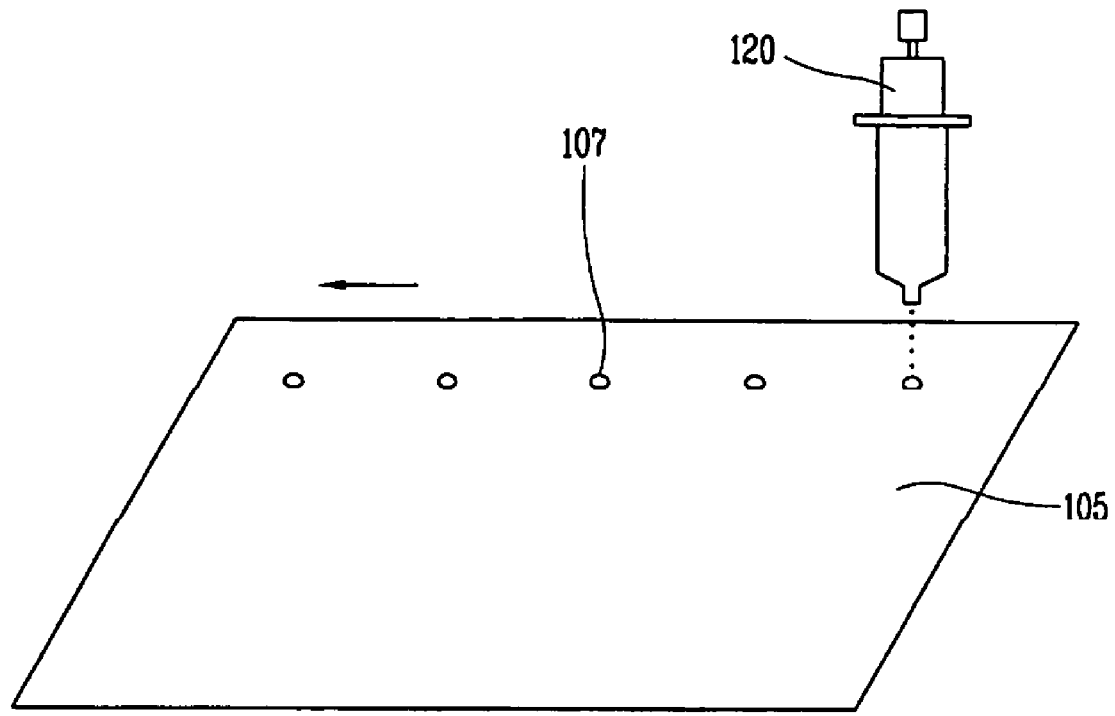
FIG. 6 is a view of a basic concept of a liquid crystal dispensing method.

FIG. 6 is a view illustrating the basic concept of a liquid crystal dispensing method. In FIG. 6, liquid crystal material 107 is dispensed onto a glass substrate 105 using a liquid crystal dispenser 120 positioned above the glass substrate 105. Although not shown, the liquid crystal material 107 may be contained in the liquid crystal dispenser 120. As the liquid crystal material 107 is dropped onto the glass substrate 105, the glass substrate 105 is moved along x- and y-directions at a predetermined speed, while the liquid crystal dispenser 120 discharges the liquid crystal material 107 at predetermined time intervals. Accordingly, the liquid crystal material 107 dropping onto the glass substrate 105 may be arranged along x- and y-directions with predetermined intervals therebetween. Alternatively, the glass substrate 105 may be fixed while the liquid crystal dispenser 120 moves along the x- and y-directions to drop the liquid crystal material 107 at predetermined intervals. However, a shape of the liquid crystal material 107 may be altered by any vibration of the liquid crystal dispenser 120, whereby errors in the dropping position and the dropping amount of the liquid crystal material 107 may occur. Therefore, it may be preferable that the liquid crystal dispenser 120 be fixed and that the glass substrate 105 be moved.

Figure 7:
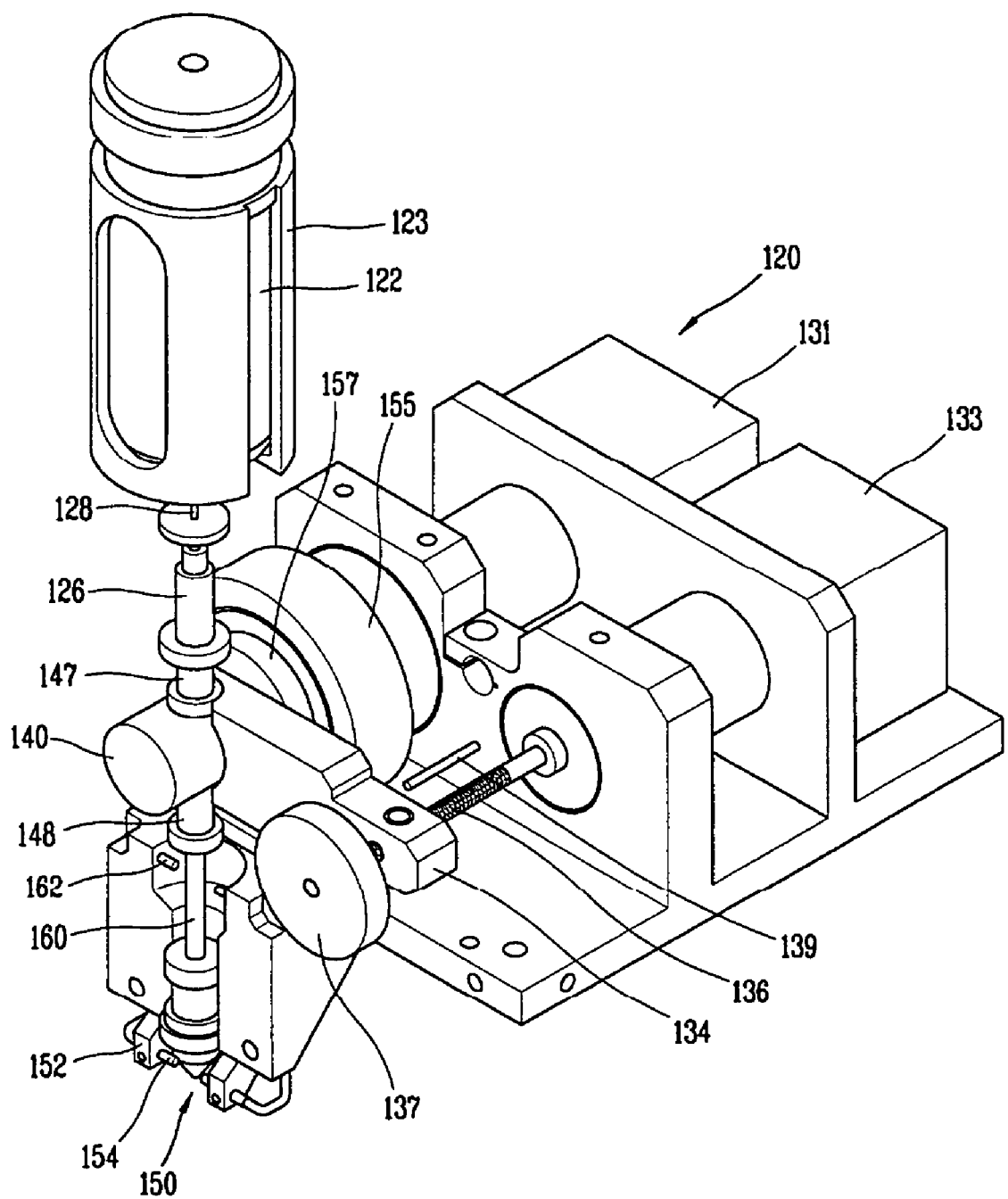
FIG. 7 is a perspective view of a liquid crystal dispenser according to an embodiment of the present invention.
Figure 8:
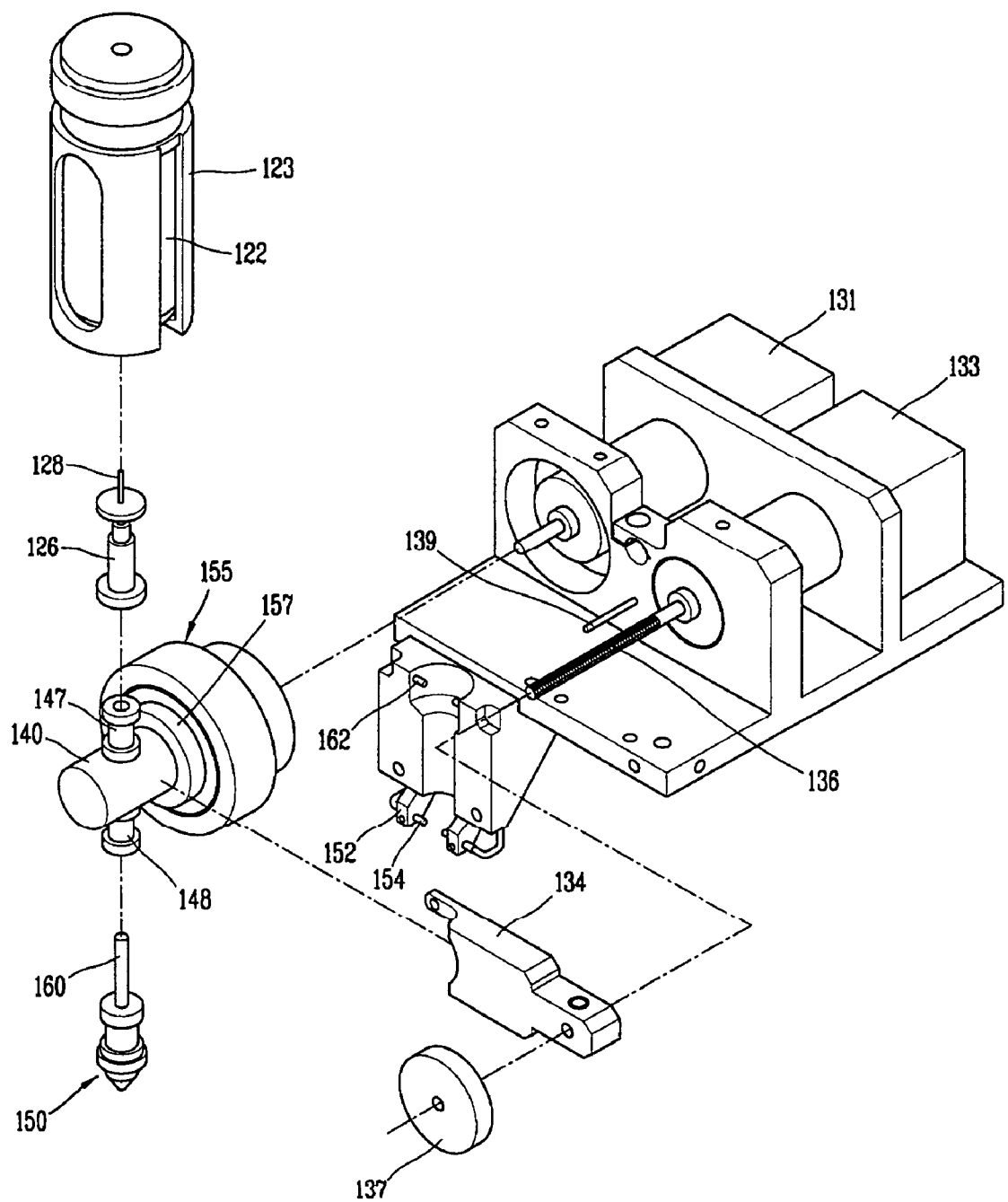
FIG. 8 is a disassembled perspective view of the liquid crystal dispenser according to an embodiment of the present invention.

FIG. 7 is a perspective view of the liquid crystal dispenser according to an embodiment of the present invention, and FIG. 8 is a disassembled perspective view of the liquid crystal dispenser according to an embodiment of the present invention. In FIGS. 7A and 7B, the liquid crystal dispenser 120 may include a cylindrically shaped liquid crystal material container 122 accommodated in a case 123. The liquid crystal material container 122 is formed of polyethylene, and the liquid crystal 107 is contained in the liquid crystal material container 122. The case 123 is formed of stainless steel and accommodates the liquid crystal material container 122 therein. Since the polyethylene has a high plasticity, a container of a desired shape can be easily formed with the polyethylene. Also, the polyethylene is non-reactive with the liquid crystal material 107 when the liquid crystal material 107 is contained therein, thereby being mainly used as the liquid crystal material container 122. However, the polyethylene has a low strength and may therefore become easily deformed by application of stress. When the liquid crystal material container 122 is deformed, the liquid crystal material 107 may not be precisely dispensed onto a substrate. Accordingly, the liquid crystal material container 122 may be inserted within the case 123 formed of stainless steel having a high strength.

Although not shown, a gas supply tube may be arranged at an upper portion of the liquid crystal material container 122 so that inert gas, such as nitrogen, may be provided thereto. The gas is supplied within portions of the liquid crystal material container 122 not occupied by the liquid crystal material 107. Accordingly, the gas presses on the liquid crystal material 107 and induces the liquid crystal material to be dispensed onto the substrate.

The liquid crystal material container 122 may include a material that does not deform, such as stainless steel. Accordingly, when the liquid crystal material container 122 is formed of stainless steel, the case 123 may not be required, thereby reducing fabrication costs of the liquid crystal dispenser 120. The interior of the liquid crystal material container 122 may be coated with a fluorine resin, thereby preventing the liquid crystal material 107 contained within the liquid crystal material container 122 from chemically reacting with sidewalls of the liquid crystal material container 122.

A liquid crystal discharge pump 140 is arranged at a lower portion of the liquid crystal material container 122. The liquid crystal discharge pump 140 is for discharging a certain amount of liquid crystal from the liquid crystal material container 122 to be dropped onto a substrate. The liquid crystal discharge pump 140 is provided with a liquid crystal suction opening 147 connected to the liquid crystal material container 122 for drawing in liquid crystal in accordance with the operation of the liquid crystal discharge pump 140, and a liquid crystal discharge opening 148 at the opposite side of the liquid crystal suction opening 147 for discharging liquid crystal in accordance with the operation of the liquid crystal discharge pump 140.

In FIG. 8, a first connecting tube 126 is coupled to the liquid crystal suction opening 147. Although the liquid crystal suction opening 147 is coupled to the first connecting tube 126 by being inserted in the drawing, the liquid crystal suction opening 147 can be coupled to the first connecting tube 126 by a coupling member such as a screw. A pin 128 such as an injection needle of which inside is penetrated is formed at one side of the first connecting tube 126. A pad (not shown) formed of a material having a high contraction characteristic and a hermetic characteristic such as silicon or butyl rubber group material is arranged at a lower portion of the liquid crystal material container 122 for discharging liquid crystal to the first connecting tube 126. The pin 128 is inserted into the liquid crystal material container 122 through the pad, thereby introducing the liquid crystal 107 of the liquid crystal material container 122 into the liquid crystal suction opening 147. When the pin 128 is inserted into the liquid crystal material container 122, the pad forms a seal around the pin 128, thereby preventing leakage of the liquid crystal 107 to the insertion region of the pin 128. Since the liquid crystal suction opening 147 and the liquid crystal material container 122 are coupled to each other by the pin and the pad, the coupling structure is simple and the coupling/detachment is facilitated. Alternatively, the liquid crystal suction opening 147 and the first connecting tube 126 may be formed as a unit. In this case, the pin 128 is formed at the liquid crystal suction opening 147 and is directly inserted into the liquid crystal material container 122 to discharge liquid crystal, thereby having a simple structure.

A nozzle 150 is formed at a lower portion of the liquid crystal discharge pump 140. The nozzle 150 is connected to the liquid crystal discharge opening 148 of the liquid crystal discharge pump 140 through a second connecting tube 160, thereby dropping the liquid crystal 107 discharged from the liquid crystal discharge pump 140 onto the liquid crystal panel of the substrate. The second connecting tube 160 may be formed of an opaque material. Alternatively, the second connecting tube 160 may be formed of a transparent material due to the following reasons.

At the time of the liquid crystal dropping, vapor is contained in the liquid crystal 107 and a dispensing amount of the liquid crystal 107 dispensed onto the substrate can not be precisely controlled. Therefore, the vapor has to be removed at the time of the liquid crystal dropping. The vapor is already contained in the liquid crystal 107 to be contained in the liquid crystal material container 122. Even if the vapor contained in the liquid crystal 107 can be removed by a vapor removing device, the vapor is not completely removed. Also, vapor may be generated when the liquid crystal 107 is introduced into the liquid crystal discharge pump 140 from the liquid crystal material container 122. Accordingly, it is impossible to completely remove the vapor contained in the liquid crystal 107. Therefore, it preferred to remove vapor by stopping the operation of the liquid crystal dispenser at the time of the vapor occurrence. Thus by forming the second connecting tube 160 of a transparent material, inferiority of the LCD device can be prevented by easily finding vapor contained in the liquid crystal material container 122 or vapor generated from the liquid crystal material container 122. The vapor can be found by the user's naked eyes, and can be automatically detected by a first sensor 162 such as a photo coupler installed at both sides of the second connecting tube 160, in which the latter case can prevent the inferiority of the LCD device with more certainty.

The nozzle 150 into which the discharged liquid crystal is introduced through the second connecting tube 160 is provided with a protection unit 152 for protecting the nozzle 150 from external stress and etc. at both side surfaces thereof. Also, a second sensor 154 for detecting whether vapor is contained in the liquid crystal dropped from the nozzle 150 or whether liquid crystal masses on the surface of the nozzle 150 is installed at the protection unit 152 at the lower portion of the nozzle 150.

The phenomenon that the liquid crystal masses on the surface of the nozzle 150 prevents a precise dropping of the liquid crystal 107. When the liquid crystal drops through the nozzle 150, a certain amount of liquid crystal spreads on the surface of the nozzle 150 even if a preset amount of liquid crystal is discharged from the liquid crystal discharge pump 140. According to this, an amount of liquid crystal less than the preset amount is dispensed onto the substrate. Also, when the liquid crystal that masses on the surface of the nozzle 150 drops on the substrate, inferiority of the LCD device may be generated. To prevent the liquid crystal from massing on the surface of the nozzle 150, material such as fluorine resin having a high contact angle with liquid crystal, that is a hydrophobic material, may be deposited on the surface of the nozzle 150 by a dipping method or a spray method. By the deposition of the fluorine resin, the liquid crystal does not spread on the surface of the nozzle 150 but is dispensed onto the substrate through the nozzle 150 as a perfect drop shape.

The liquid crystal discharge pump 140 is in a state of being inserted into a rotating member 157, and the rotating member 157 is fixed to a fixing unit 155. The rotating member 157 is connected to a first motor 131. As the first motor 131 is operated, the rotating member 157 is rotated and the liquid crystal discharge pump 140 fixed to the rotating member 157 is operated.

The liquid crystal discharge pump 140 is in contact with one side of a liquid crystal capacity amount controlling member 134 having a bar shape. A hole is formed at another side of the liquid crystal capacity amount controlling member 134, and a rotational shaft 136 is inserted into the hole. A screw is provided at the perimeter of the hole of the liquid crystal capacity amount controlling member 134 and the rotational shaft 136 so that the liquid crystal capacity amount controlling member 134 and the rotational shaft 136 are screw-coupled to each other. One end of the rotational shaft 136 is connected to a second motor 133, and another end thereof is connected to a controlling lever 137.

The discharge amount of liquid crystal from the liquid crystal material container 122 through the liquid crystal discharge pump 140 is varied according to a fixation angle of the liquid crystal discharge pump 140 to the rotating member 157. That is, a liquid crystal capacity amount of the liquid crystal discharge pump 140 is varied according to an angle that the liquid crystal discharge pump 140 is fixed to the rotating member 157. When the second motor 133 connected to the rotational shaft 136 is driven (automatically controlled) or the controlling lever 137 is operated (manually controlled), the rotational shaft 136 is rotated. According to this, one end of the liquid crystal capacity amount controlling member 134 screw-coupled to the rotational shaft 136 moves back and forth (linear direction) along the rotational shaft 136. Accordingly, as one end of the liquid crystal capacity amount controlling member 134 moves, a force applied to the liquid crystal discharge pump 140 is varied, and therefore, the fixation angle of the liquid crystal discharge pump 140 is varied.

As aforementioned, the first motor 131 operates the liquid crystal discharge pump 140 to discharge liquid crystal of the liquid crystal material container 122 and to drop the liquid crystal onto the substrate. Also, the second motor 133 controls the fixation angle of the liquid crystal discharge pump 140 fixed to the rotating member 157 to control the amount of liquid crystal discharged from the liquid crystal discharge pump 140.

A single dispensing amount of liquid crystal dropped onto the substrate through the liquid crystal discharge pump 140 is very minute, and therefore, a variation amount of the liquid crystal discharge pump 140 controlled by the second motor 133 is also minute. Accordingly, to control the discharge amount of the liquid crystal discharge pump 140, an inclination angle of the liquid crystal discharge pump 140 has to be controlled very precisely. For the precise control, a servo motor or a step motor operated by a pulse input value is used as the second motor 133.

Figure 9A:
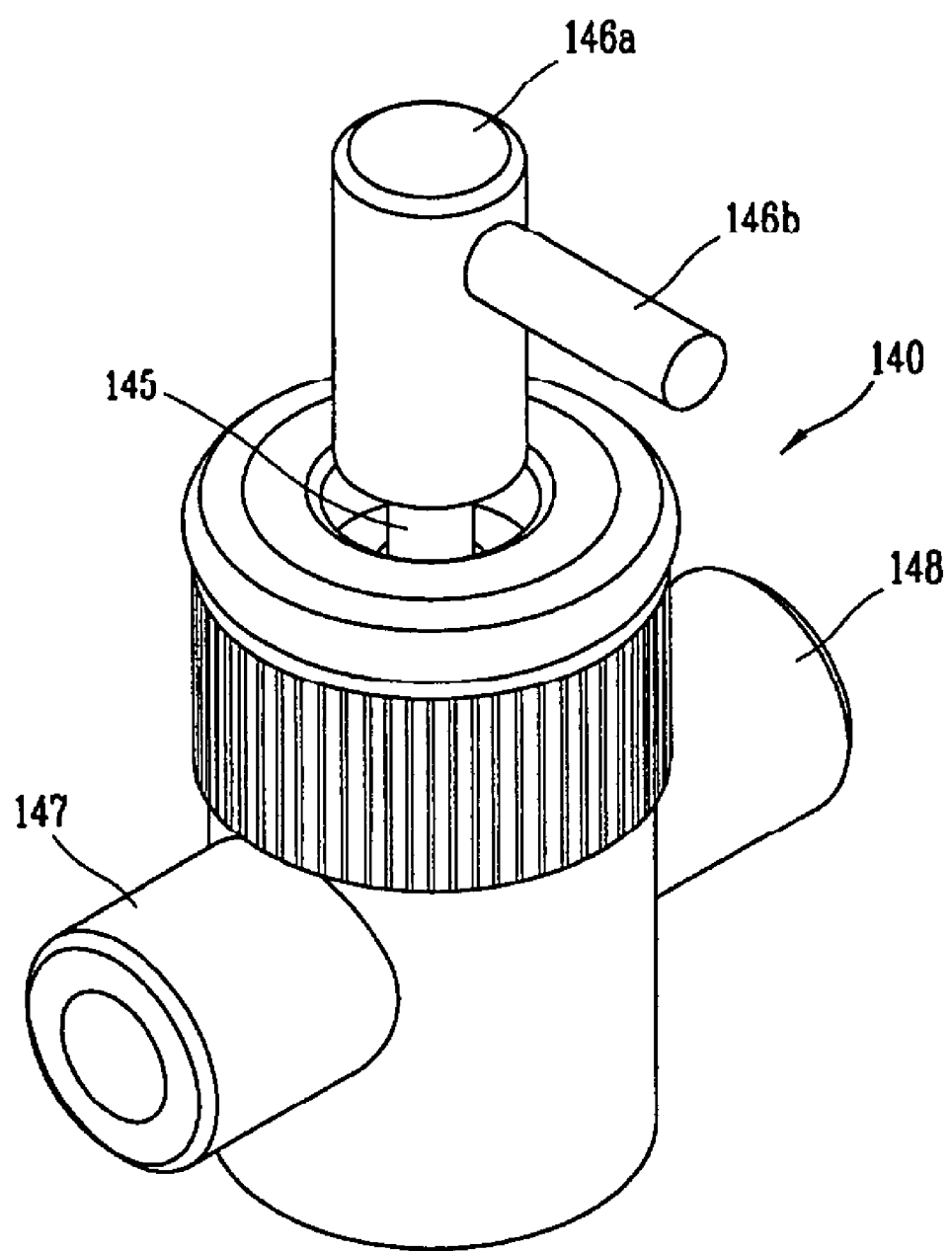
FIG. 9A is a perspective view of a liquid crystal discharge pump of the liquid crystal dispenser according to an embodiment of the present invention.
Figure 9B:
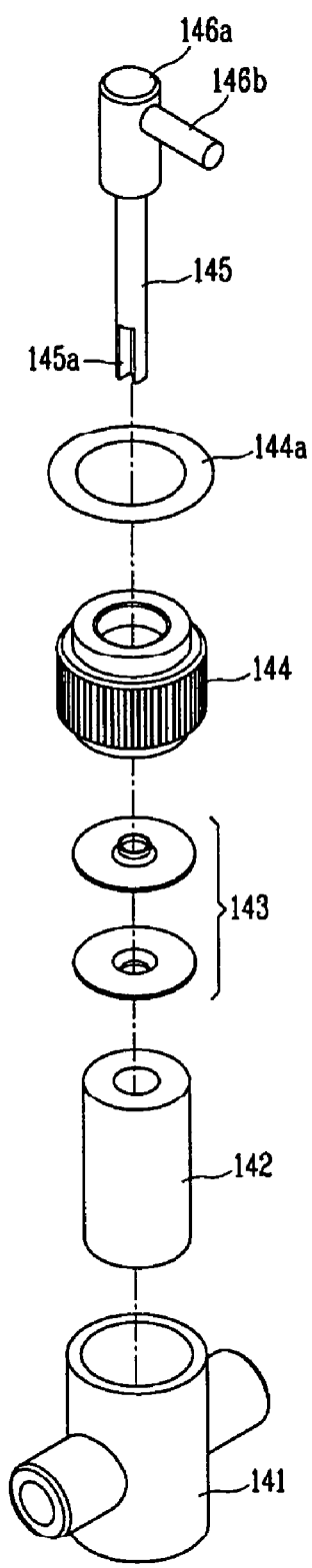
FIG. 9B is a disassembled perspective view of the liquid crystal discharge pump of FIG. 9A.

FIG. 9A is a perspective view of the liquid crystal discharge pump, and FIG. 9B is a disassembled perspective view of the liquid crystal discharge pump. In FIGS. 9A and 9B, the liquid crystal discharge pump 140 includes: a case 141 having the liquid crystal suction opening 147 and the liquid crystal discharge opening 148; a cap 144 having an opening at an upper portion thereof and coupled to the case 141; a cylinder 142 inserted into the case 141 for drawing in liquid crystal; a sealing member 143 for sealing the cylinder 142; an O-ring 144a positioned above the cap 144 for preventing liquid crystal from being leaked; and a piston 145 up-down moved and rotated by being inserted into the cylinder 142 through the opening of the cap 144, for drawing in and discharging the liquid crystal 107 through the liquid crystal suction opening 147 and the liquid crystal discharge opening 148. A head 146a fixed to the rotating member 157 is installed above the piston 145, and a bar 146b is installed at the head 146a. The bar 146b is inserted into a hole (not shown) of the rotating member 157 and is fixed, thereby rotating the piston 145 when the rotating member 157 is rotated by a force of the first motor 131.

In FIG. 9B, a groove 145a is formed at the end of the piston 145. The groove 145a has an area corresponding to approximately ¼ (or less than that) of a sectional area of a circle shape of the piston 145. The groove 145a opens and closes the liquid crystal suction opening 147 and the liquid crystal discharge opening 148 when the piston 145 is rotated (that is, moved up and down), thereby drawing in and discharging liquid crystal through the liquid crystal suction opening 147 and the liquid crystal discharge opening 148.

Operation of the liquid crystal discharge pump 140 will be explained as follows.

Figure 10:
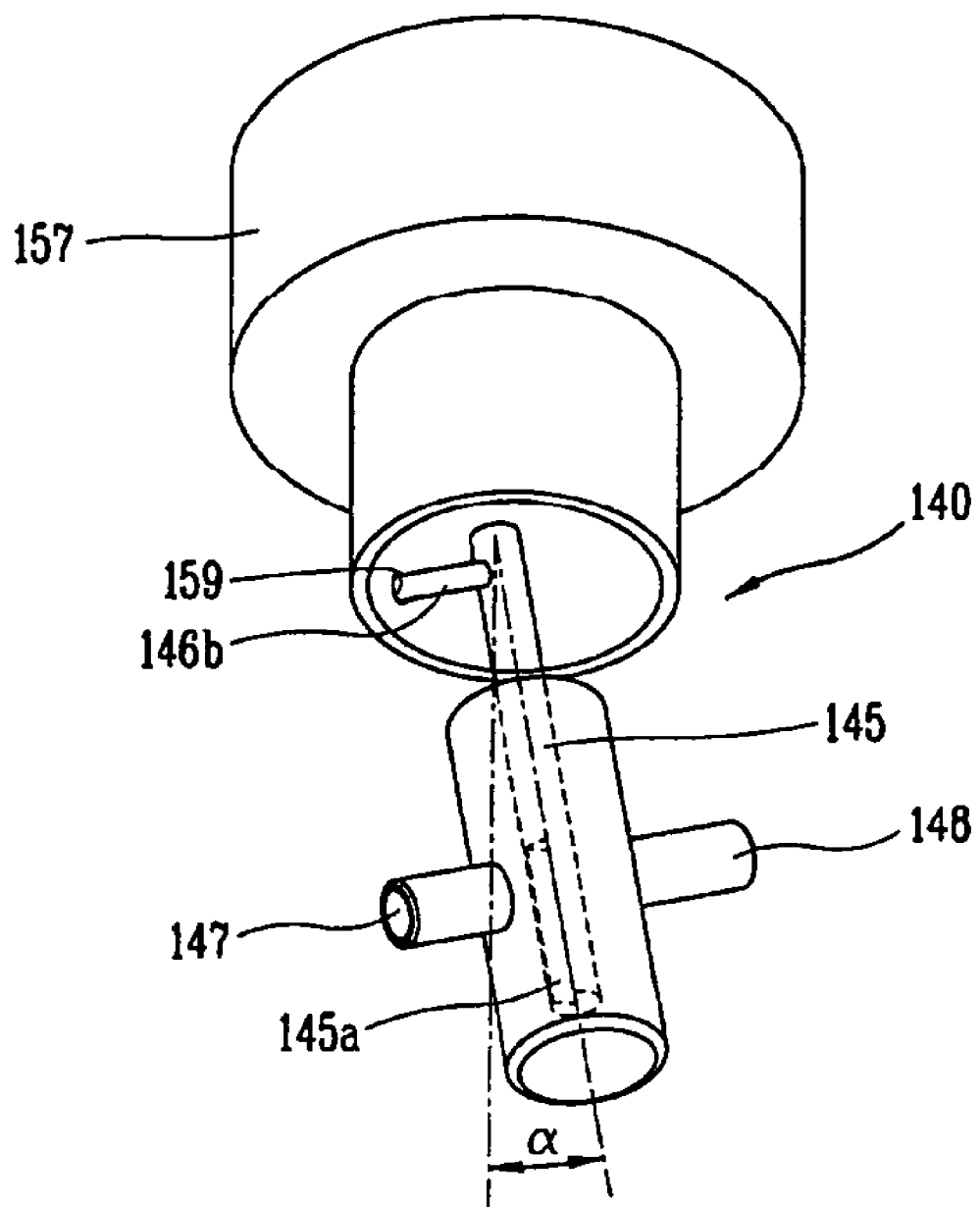
FIG. 10 is a view showing a state that the liquid crystal discharge pump is fixed to a fixing unit.

FIG. 10 is a view showing a state that the liquid crystal discharge pump 140 is fixed to the rotating member 157. In FIG. 10, the piston 145 is fixed to the rotating member 157 with a certain angle (α). The bar 146b formed at the piston head 146a is inserted into a hole 159 formed inside the rotating member 157 so that the piston 145 and the rotating member 157 are coupled to each other. Although not shown, a bearing is provided inside the hole 159 and thereby the bar 146b of the piston 145 inserted into the hole 159 can move back and forth and right and left. When the first motor 131 is operated, the rotating member 157 is rotated and thereby the piston 145 coupled to the rotating member 157 is rotated.

Herein, if the fixation angle (α) of the liquid crystal discharge pump for the rotating member 157, that is, the fixation angle (α) of the piston 145 for the rotating member 157 is supposed to be 0, the piston 145 performs only a rotational motion along the rotating member 157. However, since the fixation angle (α) of the piston 145 is not substantially zero (that is, the piston 145 is fixed with a certain angle), the piston 145 not only rotates along the rotating member 157 but also up-down moves.

If the piston 145 moves upwardly by rotating with a certain angle, a space is formed inside the cylinder 142 and liquid crystal is drawn into the space through the liquid crystal suction opening 147. Then, if the piston 145 moves downwardly by rotating more, the liquid crystal in the cylinder 142 is discharged through the liquid crystal discharge opening 148. Herein, the groove 145a formed at the piston 145 opens and closes the liquid crystal suction opening 147 and the liquid crystal discharge opening 148 at the time of sucking and discharging the liquid crystal by the rotation of the piston 145.

Figure 11A:
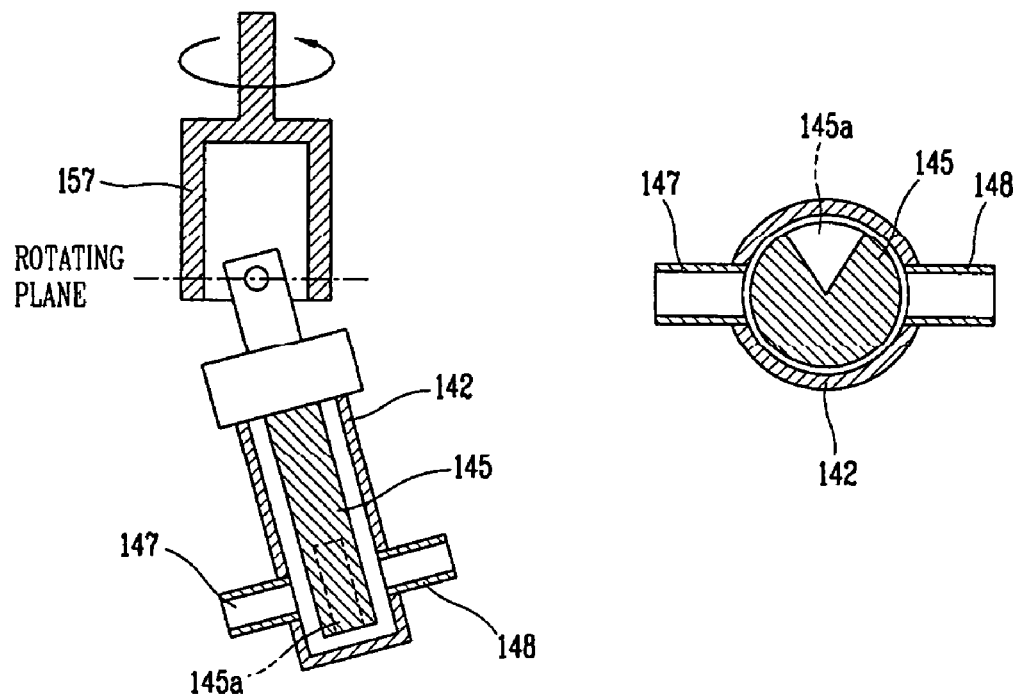
FIGS. 11A to 11D are operational views of the liquid crystal discharge pump.
Figure 11B:
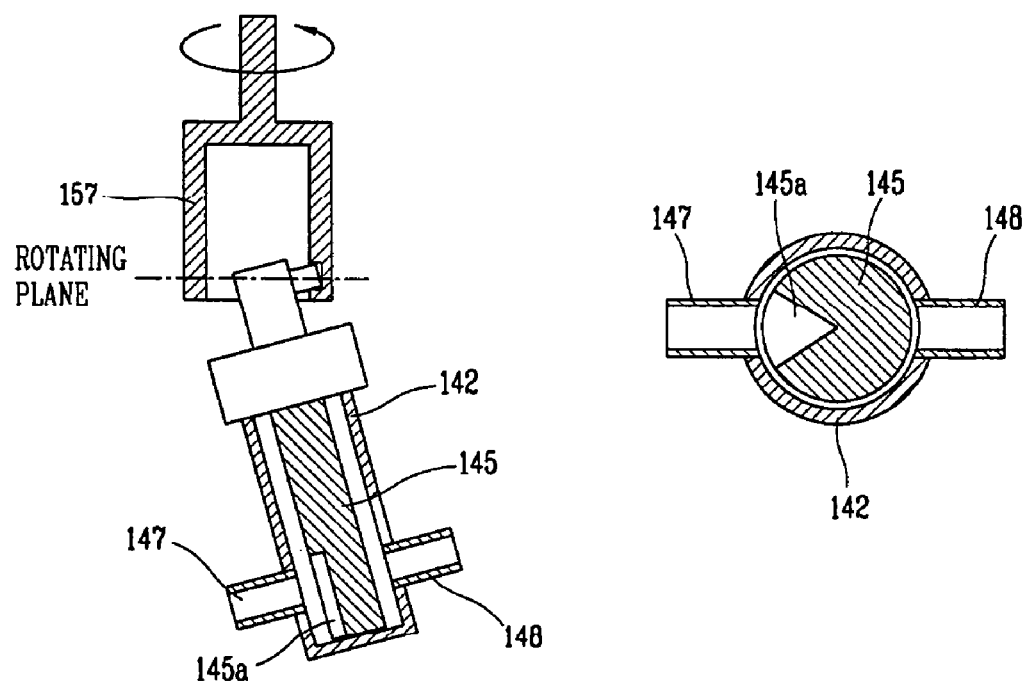
Figure 11C:
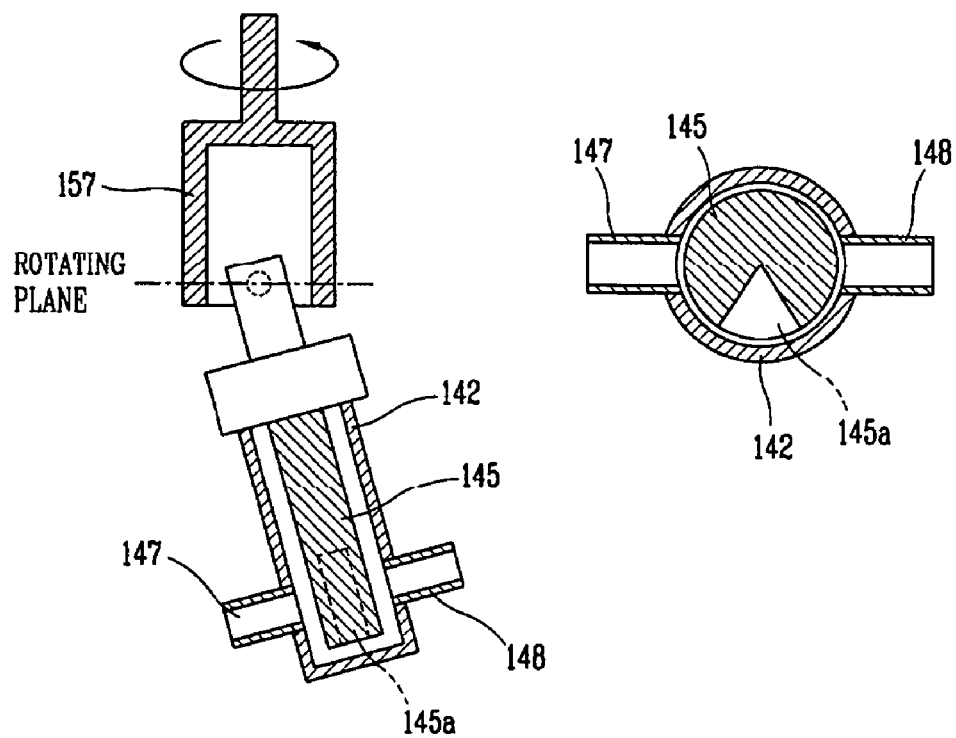
Figure 11D:
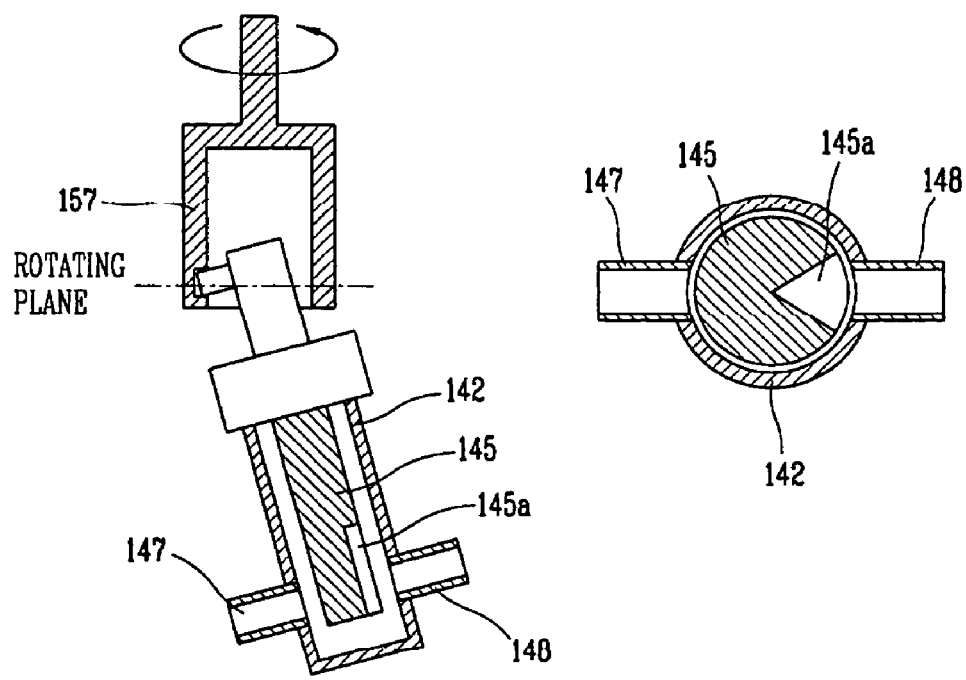

Hereinafter, operation of the liquid crystal disc charge pump 140 will be explained in more detail with reference to FIGS. 11A to 11D. In FIGS. 11A to 11D, the liquid crystal discharge pump 140 discharges the liquid crystal 107 of the liquid crystal material container 122 to the nozzle 150 through 4 strokes. FIGS. 11A and 11C are cross strokes, FIG. 11B is a suction stroke through the liquid crystal suction opening 147, and FIG. 11D is a discharge stroke through the liquid crystal discharge opening 148.

In FIG. 11A, the piston 145 fixed to the rotating member 157 with a certain angle (a) rotates accordingly as the rotating member 157 rotates. At this time, the liquid crystal suction opening 147 and the liquid crystal discharge opening 148 are closed by the piston 145.

When the rotating member 157 rotates with approximately 45°, the piston 145 rotates and the liquid crystal suction opening 147 is open by the groove 145a of the piston 145 as shown in FIG. 11B. The bar 146b of the piston 145 is inserted into the hole 159 of the rotating member 157, thereby coupling the rotating member 157 and the piston 145. Accordingly, as the rotating member 157 rotates, the piston 145 rotates. At this time, the bar 146b rotates along a rotating plane.

Since the piston 145 is fixed to the rotating member 157 with a certain angle and the bar 146b rotates along the rotating plane, the piston 145 moves upwardly accordingly as the rotating member 157 rotates. Also, accordingly as the rotating member 157 rotates, a space is formed at the cylinder 142 positioned at the lower portion of the piston 145 since the cylinder 142 is fixed. Therefore, liquid crystal is drawn into the space through the liquid crystal suction opening 147 that has been open by the groove 145a. The suction stroke of liquid crystal continues until the suction stroke of FIG. 11C starts (the liquid crystal suction opening 147 is closed) as the rotating member 157 rotates with approximately 45° after the suction stroke starts (that is, the liquid crystal suction opening 147 is open).

Then, as shown in FIG. 11D, the liquid crystal discharge opening 148 is open and the piston 145 downwardly moves accordingly as the rotating member 157 rotates more so that the liquid crystal sucked into the space inside the cylinder 142 is discharged through the liquid crystal discharge opening 148 (discharge stroke). As aforementioned, the liquid crystal discharge pump 140 repeats four strokes (that is, the first cross stroke, the suction stroke, the second cross stroke, and the discharge stroke), thereby discharging the liquid crystal 107 contained in the liquid crystal material container 122 to the nozzle 150. Herein, the discharge amount of liquid crystal is varied according to an up-down motion range of the piston 145. The up-down motion range of the piston 145 is varied according to the angle of the liquid crystal discharge pump 140 fixed to the rotating member 157.

Figure 12:
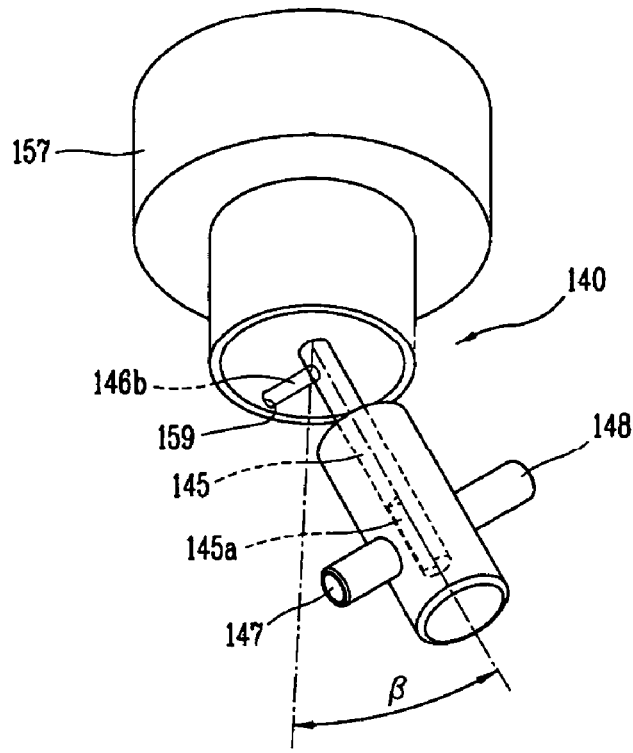
FIG. 12 is a view of the liquid crystal discharge pump of which a fixation angle has been increased.

FIG. 12 shows a liquid crystal discharge pump 140 with the piston 145 fixed to the rotating member 157 with an angle of β. When compared to the liquid crystal discharge pump 140 of FIG. 10 having the piston 145 fixed to the rotating member 157 with the angle of α, the liquid crystal discharge pump 140 of FIG. 12 having the piston 145 fixed to the rotating member 157 with an angle of β(>α) enables the piston 145 to upwardly move more highly. That is, the greater the angle of the liquid crystal discharge pump 140 relative to the rotating member 157 is, the greater the amount of the liquid crystal 107 drawn into the cylinder 142 at the time of the piston motion is. This means that the discharge amount of liquid crystal can be controlled by adjusting the angle of the liquid crystal discharge pump 140 fixed to the rotating member 157.

The angle of the liquid crystal discharge pump 140 fixed to the rotating member 157 is controlled by the liquid crystal capacity amount controlling member 134 of FIG. 7, and the liquid crystal capacity amount controlling member 134 is moved by driving the second motor 133. That is, the angle of the liquid crystal discharge pump 140 fixed to the rotating member 157 is controlled by controlling the second motor 133.

The fixation angle of the liquid crystal discharge pump 140 can be manually adjusted by handling the angle controlling lever 137 by the user. However, in this case, a precise adjustment is not possible, a lot of time is required, and the driving of the liquid crystal discharge pump has to be stopped during the operation. Therefore, it is preferable to adjust the fixation angle of the liquid crystal discharge pump 140 by the second motor 133. The fixation angle of the liquid crystal discharge pump 140 is measured by a sensor 139 such as a linear variable differential transformer. If the fixation angle exceeds a preset angle, the sensor 139 rings the alarm thus to prevent the liquid crystal discharge pump 140 from being damaged. Although not shown, the first motor 131 and the second motor 133 are connected to a control unit by wire or wirelessly. Each kind of information is input to the control unit to calculate a dispensing amount of liquid crystal to be dispensed onto a liquid crystal panel and to control each kind of unit.

A dispensing amount of liquid crystal is related to a height of a spacer. In the related liquid crystal vacuum injection method, a ball spacer is mainly used. However, in the liquid crystal dispensing method, a pattern spacer or a column spacer is mainly used for reasons which will be described as follows. As aforementioned, the liquid crystal dispensing method is mainly used to fabricate a liquid crystal panel of a large area. When ball spacers are used in a liquid crystal panel of a large area, it is difficult to uniformly disperse the ball spacer onto a substrate, and instead, the dispersed ball spacers mass on the substrate, thereby causing a cell gap inferiority of the liquid crystal panel. As a result, in the liquid crystal dispensing method according to the present invention, a pattern spacer is formed at a preset position to solve this problem.

When the height of the pattern spacer formed at the color filter substrate is different from a preset cell gap, an amount of liquid crystal contained in the substantially fabricated liquid crystal panel is different from an optimum liquid crystal amount even if a preset dispensing amount of liquid crystal is dispensed onto the substrate because the cell gap becomes different according to the height of the substantially formed pattern spacer. When the dispensed amount of liquid crystal is less than the optimum dispensing amount, for example, with an LCD device of a normally black mode, a problem is generated in a black brightness, and with an LCD device of a normally white mode, a problem is generated in a white brightness.

In contrast, when the dispensed amount of liquid crystal is more than the optimum dispensing amount of liquid crystal, a gravitation inferiority is generated at the time of fabricating a liquid crystal panel. The gravitation inferiority is generated accordingly as a volume of a liquid crystal layer formed inside the liquid crystal panel at the time of fabricating the liquid crystal panel is increased by a temperature rising. As a result, the cell gap of the liquid crystal panel becomes greater than the spacer and liquid crystal moves downward by gravitation, thereby causing an uneven cell gap of the liquid crystal panel and degrading the quality of the LCD device.

The control unit calculates a dispensing amount of liquid crystal not based on a preset cell gap but based on a substantially measured spacer height.

The spacer height is input at the time of a spacer forming process of a TFT process or a color filter process. That is, in the spacer forming process, a spacer is formed, and then the spacer height is measured and provided to the control unit. The spacer forming line is separately formed from a liquid crystal dispensing line. As a result, the measured spacer height is input to the control unit by a wired or wireless connection. Also, the spacer height may be measured by a separate process. For example, the spacer height may be measured by providing a spacer height measuring unit between the spacer forming process line (that is, a TFT processing line or a color filter processing line) and the liquid crystal dispensing line, and the measured height may be input to the liquid crystal dispensing line.

Figure 13:
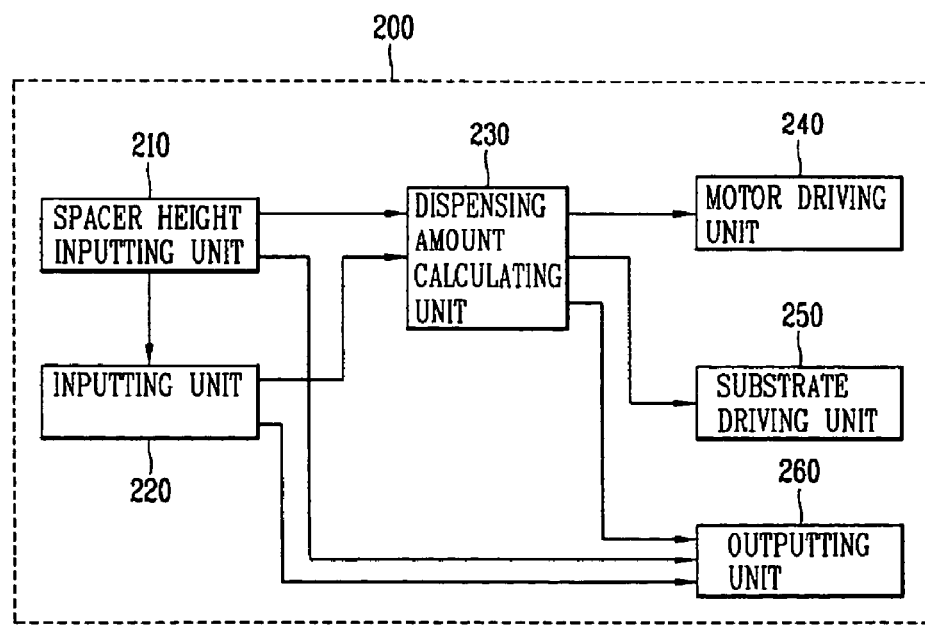
FIG. 13 is a block diagram of a control unit of a liquid crystal dispensing system according to an embodiment of the present invention.

In FIG. 13, the control unit 200 includes a spacer height inputting unit 210 for inputting a spacer height measured in the TFT processing line or the color filter processing line by wire or wireless connection; an inputting unit 220 for inputting each kind of information such as a substrate area, a number of panel sheets to be formed on the substrate, a panel position, a panel area, a kind of liquid crystal, and a viscosity of liquid crystal; a dispensing amount calculating unit 230 for calculating a dispensing amount of liquid crystal to be dispensed onto the liquid crystal panel based on a pattern spacer height inputted form the spacer height inputting unit 210 and each kind of information input from the inputting unit 220; a motor driving unit 240 for operating the second motor 133 to discharge the calculated dispensing amount, thereby controlling a fixation angle of the liquid crystal discharge pump 140; a substrate driving unit 250 for driving the substrate, thereby moving the liquid crystal dispenser to the initial dispensing position of a corresponding liquid crystal panel; and an outputting unit 260 for outputting each kind of information such as the number of liquid crystal panel sheets formed on the substrate, a size of a panel on which the current dispensing is being performed, a dispensing amount of liquid crystal to be dispensed on a corresponding panel, and the current liquid crystal dispensing condition.

The dispensing amount calculating unit 230 calculates a dispensing amount of liquid crystal to be dispensed onto the liquid crystal panel based on the panel size, the pattern spacer height, and the liquid crystal characteristic information. That is, the dispensing amount calculating unit 230 does not calculate the dispensing amount of liquid crystal as a glass substrate unit on which a plurality of liquid crystal panels are formed but calculates the dispensing amount of liquid crystal as a liquid crystal panel unit.

As aforementioned, the dispensing amount of liquid crystal is calculated as the liquid crystal panel unit to be dispensed onto the multi-model glass substrate on which the liquid crystal panels having different sizes are formed. Since the liquid crystal panels having different sizes are formed on the multi-model glass substrate, the efficiency of the glass substrate is enhanced, thereby reducing the fabrication cost. When the plurality of liquid crystal panels formed on the glass substrate have different cell gaps (that is, the spacer heights are different from one another), the dispensing system according to the present invention can be more effectively applied to dispense liquid crystal onto the multi-model glass substrate because the dispensing amount of liquid crystal dispensed onto each liquid crystal panel is calculated based on the spacer height.

Figure 14:
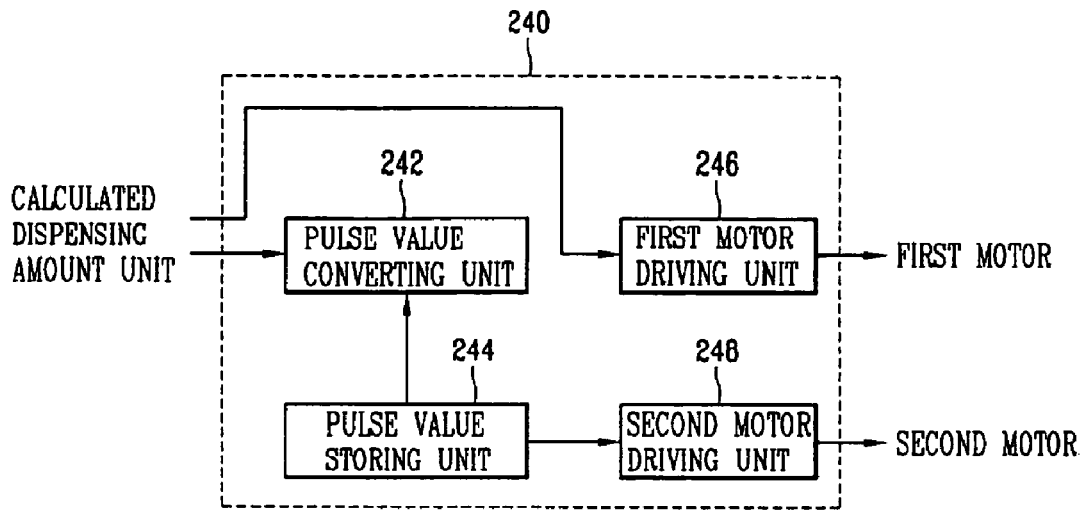
FIG. 14 is a block diagram of a motor driving unit according to an embodiment of the present invention.

In FIG. 14, the motor driving unit 240 includes a pulse value storing unit 244 for storing pulse value information regarding a dispensing amount of liquid crystal to drive the first motor 131 and the second motor 133; a pulse value converting unit 242 for converting a calculated dispensing amount value input from the dispensing amount calculating unit 230 into a pulse value based on the pulse value information stored in the pulse value storing unit 244; a first motor driving unit 246 for outputting a driving signal according to the calculated dispensing amount value is input, thereby driving the first motor 131 for operating the liquid crystal discharge pump 140; and a second motor driving unit 248 for outputting a driving signal for driving the second motor 133 according to the pulse value converted by the pulse value converting unit 242 is input, thereby varying a fixation angle of the liquid crystal discharge pump 140.

Much rotation angle information of the second motor 133 regarding a pulse value is stored in the pulse value storing unit 244. Therefore, as a pulse value is input, the second motor 133 is rotated as much as a corresponding angle and at the same time, the liquid crystal capacity amount controlling member 134 inserted into the rotational shaft 136 is linearly moved. Eventually, by the motion of the liquid crystal capacity amount controlling member 134, the fixation angle of the liquid crystal discharge pump 140 to a fixing unit 149 is varied, thereby varying the discharge amount of liquid crystal from the liquid crystal discharge pump 140. As aforementioned, the second motor 133 is a step motor and is rotated one time accordingly as approximately 1000 pulses are input. That is, the second motor 133 is rotated approximately 0.36° for one pulse. Therefore, the rotation angle of the second motor 133 can be precisely controlled by a pulse, and the discharge amount of the liquid crystal discharge pump 140 can be precisely controlled.

Figure 15:
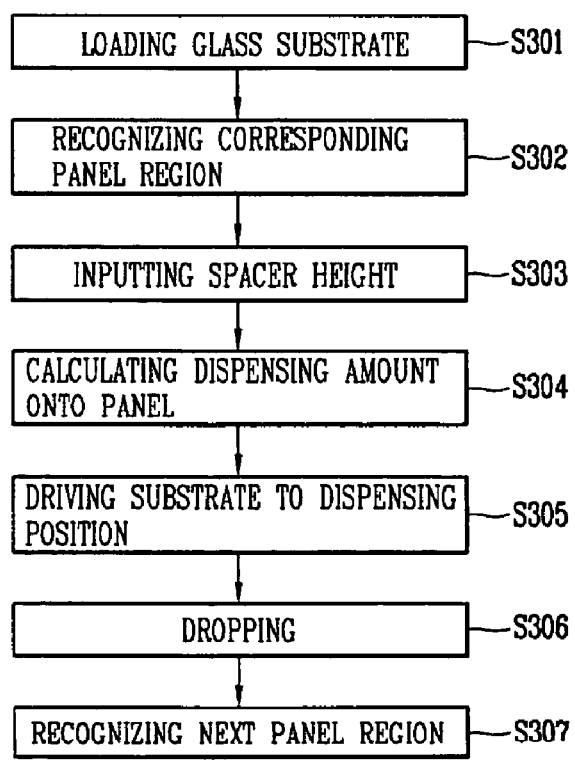
FIG. 15 is a flow chart showing a liquid crystal dispensing method according to an embodiment of the present invention.

FIG. 15 shows a liquid crystal dispensing method using a spacer height. Even if a liquid crystal dispensing method onto the multi-model glass substrate is illustrated in FIG. 15, a liquid crystal dispensing method onto one-model glass substrate can be applied thereto.

As shown in FIG. 15, a glass substrate including a plurality of liquid crystal panels having different sizes where a TFT or a color filter has been formed in the TFT processes or the color filter processes is input (S301). Herein, each kind of information regarding the substrate and the liquid crystal panel such as the substrate size, the number of liquid crystal panel sheets, the size of each liquid crystal panel, a coordinate of the liquid crystal panel, and the initial dispensing position is input to the control unit 200 of the liquid crystal dispenser. Also, liquid crystal characteristic information such as a kind of liquid crystal and a viscosity of liquid crystal is input to the control unit 200. Herein, the liquid crystal information, the substrate information, and the liquid crystal panel information can be directly input by the user, and can be input by reading a recognition code such as a bar code formed on the glass substrate.

The control unit 200 checks the coordinate and the size of the liquid crystal panel to which liquid crystal is to be dispensed based on the input information to recognize a corresponding panel (S302). In the TFT processes or the color filter processes line, a pattern spacer is formed on the substrate and the height of the pattern spacer is measured to be input to the control unit 200 (S303).

Then, the control unit 200 calculates liquid crystal a dispensing amount for each liquid crystal panel based on the input each kind of information input and the spacer height (S304), and drives the substrate to align the liquid crystal dispenser 120 with the initial dispensing position of the liquid crystal panel on which liquid crystal is to be dispensed. Although not shown, since the substrate is moved in x and y directions by a motor, the motor is driven to move the substrate to the dispensing position of the liquid crystal panel. Herein, it is also possible to align the liquid crystal dispenser 120 with the initial dispensing position of the liquid crystal panel by directly driving the liquid crystal dispenser 120 instead of driving the substrate.

As aforementioned, the liquid crystal dispensing is performed under the state that the liquid crystal dispenser 120 is aligned with the dispensing position of the substrate (S305, S306). Herein, the pulse value converting unit 242 of the motor driving unit 240 calculates a pulse value corresponding to the calculated dispensing amount of liquid crystal to drive the second motor 133, thereby adjusting the fixation angle of the liquid crystal discharge pump 140. Accordingly, as the first motor 131 is operated, liquid crystal is dispensed onto the liquid crystal panel.

If the liquid crystal dispensing onto a corresponding liquid crystal panel is completed, the control unit 200 recognizes the next panel on which liquid crystal is to be dispensed (S307) and repeats the calculation process of the dispensing amount. That is, the control unit 200 calculates the dispensing amount of liquid crystal based on the spacer height formed on the corresponding panel and each kind of information to dispense liquid crystal onto the corresponding liquid crystal panel.

As aforementioned, in accordance with embodiments of the present invention, the dispensing amount of liquid crystal is calculated based on the spacer height formed in the TFT processes or the color filter processes. As a result, the inferiority of the LCD device due to an inaccurate liquid crystal dispensing can be prevented. Also, in accordance with embodiments of the present invention, the dispensing amount of liquid crystal is calculated for each liquid crystal panel unit, thereby dispensing a precise amount of liquid crystal onto the multi-model glass substrate.

It should be recognized that the present invention may be varied from the exemplary embodiments shown and described. For example, the liquid crystal dispensing system may be able to read information of a liquid crystal container as described in Korean Patent Application No. 2003-41277, filed Jun. 24, 2003, which is hereby incorporated by reference. Also, the liquid crystal dispensing system may have a separable liquid crystal discharging pump as described in Korean Patent Application No. 2003-41278, filed Jun. 24, 2003, which is hereby incorporated by reference.

It will be apparent to those skilled in the art that various modifications and variations can be made in the liquid crystal dispensing system and method of dispensing liquid crystal material using the same of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing system, comprising:
a container to contain liquid crystal;
a discharge pump to draw in and discharge liquid crystal from the container;
a nozzle to dispense the liquid crystal discharged from the discharge pump onto a substrate; and
a control unit to determine a dispensing amount of liquid crystal based on a spacer height formed at the substrate and to control the discharge pump in order to dispense the determined amount of liquid crystal onto the substrate, wherein the control unit includes:
a height inputting unit to input a height of a spacer formed at a substrate;
a dispensing amount calculating unit to calculate a dispensing amount of liquid crystal to be dispensed onto a substrate; and
a motor driving unit to drive a motor in order to operate the discharge pump.

2. A liquid crystal dispensing system, comprising:
a container to contain liquid crystal;
a discharge pump to draw in and discharge liquid crystal from the container;
a nozzle to dispense the liquid crystal discharged from the discharge pump onto a substrate;
a control unit to determine a dispensing amount of liquid crystal based on a spacer height formed at the substrate and to control the discharge pump in order to dispense the determined amount of liquid crystal onto the substrate;
a cylinder;
a piston, inserted into the cylinder and having a groove at a lower portion, to draw in and discharge liquid crystal in accordance with a rotational and up-down motion; and
a suction opening and a discharge opening to respectively draw in and discharge liquid crystal accordingly as the piston moves.

3. The liquid crystal dispensing system according to claim 2, further comprising a fixing unit to fix the discharge pump.

4. The liquid crystal dispensing system according to claim 3, wherein the fixing unit includes a rotating member to which the piston of the discharge pump is fixed to rotate the piston.

5. The liquid crystal dispensing system according to claim 4, wherein the piston is provided with a bar, the rotating member is provided with a hole, and the bar is rotatably inserted into the hole to fix the piston with the rotating member.

6. The liquid crystal dispensing system according to claim 4, wherein a liquid crystal capacity amount of the discharge pump is varied according to a fixation angle of the piston to the rotating member.

7. A liquid crystal dispensing system, comprising:
a container to contain liquid crystal;
a discharge pump to draw in and discharge liquid crystal from the container;
a nozzle to dispense the liquid crystal discharged from the discharge pump onto a substrate;
a control unit to determine a dispensing amount of liquid crystal based on a spacer height formed at the substrate and to control the discharge pump in order to dispense the determined amount of liquid crystal onto the substrate; and
a liquid crystal capacity amount controlling member contacting the discharge pump to vary a fixation angle of the discharge pump in order to control a liquid crystal discharge amount.

8. The liquid crystal dispensing system according to claim 7, further comprising:
a motor to drive the liquid crystal capacity amount controlling member; and
a rotational shaft screw-coupled to the liquid crystal capacity amount controlling member to be rotated as the motor is driven in order to linearly move the liquid crystal capacity amount controlling member.

9. The liquid crystal dispensing system according to claim 8, wherein the motor includes one of a servo motor and a step motor.

10. The liquid crystal dispensing system according to claim 1, further comprising:
a first connecting tube connecting the container and the discharge pump; and
a pin at the end of the first connecting tube and inserted into a pad formed at the container to introduce liquid crystal to the container.

11. The liquid crystal dispensing system according to claim 1, further comprising a second connecting tube connecting the discharge pump and the nozzle.

12. The liquid crystal dispensing system according to claim 11, wherein the second connecting tube is formed of a transparent material.

13. The liquid crystal dispensing system according to claim 12, further comprising a first sensor installed near the second connecting tube to detect whether vapor is contained in liquid crystal discharged from the discharge pump.

14. The liquid crystal dispensing system according to claim 1, further comprising a second sensor installed near the nozzle to detect whether liquid crystal is massed on the surface of the nozzle.

15. The liquid crystal dispensing system according to claim 1, wherein the spacer is a pattern spacer.

16. The liquid crystal dispensing system according to claim 1, wherein the substrate includes a plurality of liquid crystal panels having different sizes.

17. The liquid crystal dispensing system according to claim 16, wherein the dispensing amount of liquid crystal is calculated based on a height of a spacer formed at a liquid crystal panel.

18. The liquid crystal dispensing system according to claim 2, wherein the control unit includes:
a height inputting unit to input a height of a spacer formed at a substrate;
a dispensing amount calculating unit to calculate a dispensing amount of liquid crystal to be dispensed onto a substrate; and
a motor driving unit to drive a motor in order to operate a discharge pump.

19. The liquid crystal dispensing system according to claim 1, further comprising a substrate driving unit to drive a substrate in order to align a nozzle at a dispensing position of liquid crystal.

20. The liquid crystal dispensing system according to claim 1, wherein the motor driving unit includes:
a pulse value storing unit to store pulse value information regarding a dispensing amount of liquid crystal; and
a pulse value converting unit to convert a calculated dispensing amount value input from the dispensing amount calculating unit into a pulse value based on the pulse value information stored in the pulse value storing unit.

21. A liquid crystal dispensing system, comprising:
a liquid crystal dispenser having a container to contain liquid crystal, a cylinder having a suction opening and a discharge opening, a discharge pump to draw in and discharging liquid crystal contained in the container through the suction opening and the discharge opening by being inserted into the cylinder and by moving up-down, and a nozzle to dispense the liquid crystal discharged from the discharge pump onto a substrate;
a control unit to calculate a dispensing amount of liquid crystal to be dispensed onto the substrate based on a spacer height formed on the substrate and to control the discharge pump; and
a liquid crystal capacity amount controlling member contacting the discharge pump to vary a fixation angle of the discharge pump based on the calculated dispensing amount of liquid crystal.

22. A liquid crystal dispensing system, comprising:
a liquid crystal dispenser having a container to contain liquid crystal, a discharge pump having a piston to draw in and discharge liquid crystal contained in the container by an up-down motion of the piston, and a nozzle to dispense liquid crystal discharged from the discharge pump onto a multi-model substrate for fabricating a plurality of liquid crystal panels of different sizes; and
a control unit to calculate a dispensing amount of liquid crystal to be dispensed onto the plurality of liquid crystals panels based on a spacer height formed at the liquid crystal panel of the substrate, and to control the discharge pump in order to sequentially dispense liquid crystal onto the plurality of liquid crystal panels, wherein the control unit includes:
a height inputting unit to input the spacer height formed at a substrate;
a dispensing amount calculating unit to calculate the dispensing amount of liquid crystal to be dispensed onto a substrate; and
a motor driving unit to drive a motor in order to operate the discharge pump.

23. A method of dispensing liquid crystal material, comprising:

inputting a spacer height formed on a substrate;

calculating a dispensing amount of liquid crystal to be dispensed onto the substrate based on the spacer height;

aligning a liquid crystal dispenser at a dispensing position, the liquid crystal dispenser including a container containing liquid crystal, a discharge pump having a piston to draw in and discharge liquid crystal contained in the container by an up-down motion of the piston, and a nozzle to dispensing liquid crystal discharged from the discharge pump onto a multi-model substrate for fabricating a plurality of liquid crystal panels of different sizes;

driving a second motor to adjust a fixation angle of the discharge pump to discharge the calculated amount of liquid crystal; and dispensing the calculated amount of liquid crystal onto the substrate.

24. The method according to claim 23, wherein dispensing liquid crystal onto the substrate includes driving a first motor to operate the piston.

25. The method according to claim 23, further comprising:

forming a spacer on a substrate; and measuring a height of the formed spacer.

26. The method according to claim 25, wherein the spacer is formed in a TFT process or a color filter process.

27. The method according to claim 26, wherein the spacer height is measured in a TFT process or a color filter process.

28. The method according to claim 23, wherein the spacer is a pattern spacer.

29. The method according to claim 23, wherein the substrate includes a plurality of liquid crystal panels having different sizes.

30. The method according to claim 23, wherein calculating a dispensing amount of liquid crystal includes calculating a dispensing amount of liquid crystal based on a spacer height formed at each liquid crystal panel.

31. A method of dispensing liquid crystal material, comprising:

preparing a substrate including a plurality of liquid crystal panels having different sizes;

inputting a spacer height formed at the liquid crystal panel;

calculating a dispensing amount of liquid crystal to be dispensed on the liquid crystal panel based on the spacer height;

aligning a liquid crystal dispenser at a dispensing position of a corresponding liquid crystal panel, the liquid crystal dispenser including a container containing liquid crystal, a discharge pump having a piston that draws in and discharges liquid crystal contained in the container by an up-down motion of the piston, and a nozzle that dispenses liquid crystal discharged from the discharge pump onto a multi-model substrate on which including a plurality of liquid crystal panels of different sizes;

adjusting a fixation angle of the discharge pump to discharge the calculated amount of liquid crystal to be dispensed;

dispensing the calculated amount of liquid crystal onto the substrate; and aligning the liquid crystal dispenser at a dispensing position of the next liquid crystal panel on which liquid crystal is to be dispensed.

32. A method of manufacturing a liquid crystal display device using the liquid crystal dispensing system according to claim 1, the method comprising:

providing a first substrate;

dispensing liquid crystal from the liquid crystal dispensing system; and joining the first substrate with a second substrate.

33. A method of manufacturing a liquid crystal display device using the liquid crystal dispensing system according to claim 1, the method comprising:

providing a first substrate;

dispensing liquid crystal from the liquid crystal dispensing system; and joining the first substrate with a second substrate.

34. A method of manufacturing a liquid crystal display device using the liquid crystal dispensing system according to claim 21, the method comprising:

providing a first substrate;

dispensing liquid crystal from the liquid crystal dispensing system; and joining the first substrate with a second substrate.

35. A method of manufacturing a liquid crystal display device using the liquid crystal dispensing system according to claim 22, the method comprising:

providing a first substrate;

dispensing liquid crystal from the liquid crystal dispensing system; and joining the first substrate with a second substrate.

* * * * *